United States Patent
Lin et al.

(10) Patent No.: US 10,529,459 B2
(45) Date of Patent: Jan. 7, 2020

(54) PASSIVE CONTAINMENT HEAT REMOVAL SYSTEM AND CONTROL METHOD THEREOF

(71) Applicants: STATE NUCLEAR POWER RESEARCH INSTITUTE, Beijing (CN); STATE NUCLEAR POWER TECHNOLOGY CORPORATION LTD., Beijing (CN)

(72) Inventors: Chengge Lin, Beijing (CN); Meng Wang, Beijing (CN); Feng Shen, Beijing (CN); Shengjun Zhang, Beijing (CN); Zusheng Yu, Beijing (CN); Yaodong Chen, Beijing (CN)

(73) Assignees: STATE NUCLEAR POWER RESEARCH INSTITUTE, Beijing (CN); STATE NUCLEAR POWER TECHNOLOGY CORPORATION LTD., Beijing (CN)

( * ) Notice: Subject to any disclaimer, the term of this patent is extended or adjusted under 35 U.S.C. 154(b) by 406 days.

(21) Appl. No.: 15/301,677

(22) PCT Filed: Apr. 3, 2015

(86) PCT No.: PCT/CN2015/075867
§ 371 (c)(1),
(2) Date: Oct. 3, 2016

(87) PCT Pub. No.: WO2015/149718
PCT Pub. Date: Oct. 8, 2015

(65) Prior Publication Data
US 2017/0162282 A1    Jun. 8, 2017

(30) Foreign Application Priority Data
Apr. 3, 2014  (CN) .......................... 2014 1 0133614

(51) Int. Cl.
*G21C 15/18*   (2006.01)
*G21C 15/12*   (2006.01)
(Continued)

(52) U.S. Cl.
CPC .......... *G21C 15/182* (2013.01); *G21C 9/012* (2013.01); *G21C 15/12* (2013.01); *G21C 15/18* (2013.01); *G21C 13/02* (2013.01); *Y02E 30/32* (2013.01)

(58) Field of Classification Search
CPC ....... G21C 15/18; G21C 15/182; G21C 15/12
See application file for complete search history.

(56) References Cited

U.S. PATENT DOCUMENTS 3,859,166 A * 1/1975 Flynn .................... G21C 15/18
                                                           376/282
4,236,968 A * 12/1980 Werker .................. G21C 15/18
                                                           376/299
(Continued)

FOREIGN PATENT DOCUMENTS

CN       102637465 A     8/2012
CN       102867550 A  *  1/2013
(Continued)

OTHER PUBLICATIONS

Yu et al.; "Design TANES passive containment cooling system"; 8th National Nuclear Reactor Thermal Fluid Conf. of China Nuclear Society; Mar. 2005; p. 166-173 (contains English abstract).
(Continued)

*Primary Examiner* — Lily C Garner
(74) *Attorney, Agent, or Firm* — BakerHostetler

(57) ABSTRACT

A passive containment heat removal system and a control method thereof are provided. The system includes an outer containment an inner containment disposed in the outer containment, an air duct formed between the inner containment and the outer containment having an air inlet and an air outlet; a spraying assembly disposed outside the inner containment and configured to passively spray cooling water to an outer wall of the inner containment to cool the inner containment; a built-in heat exchanger disposed in the inner (Continued)

containment; an air cooling channel having an air inlet of the air cooling channel and an air outlet of the air cooling channel; an external air cooler disposed in the air cooling channel with an inlet connected with an outlet of the built-in heat exchanger via a first communicating pipe and an outlet connected with an inlet of the built-in heat exchanger via a second communicating pipe.

21 Claims, 23 Drawing Sheets

(51) Int. Cl.
  *G21C 9/012* (2006.01)
  *G21C 13/02* (2006.01)

(56) References Cited

U.S. PATENT DOCUMENTS

| | | | | |
|---|---|---|---|---|
| 4,713,199 A | * | 12/1987 | Spilker | G21C 19/08 250/506.1 |
| 5,345,482 A | | 9/1994 | Conway et al. | |
| 6,097,778 A | * | 8/2000 | Cheung | G21C 15/18 376/282 |
| 2004/0136489 A1 | * | 7/2004 | Takahashi | G21C 9/00 376/293 |
| 2013/0223581 A1 | * | 8/2013 | Katono | G21C 13/02 376/280 |

FOREIGN PATENT DOCUMENTS

| | | |
|---|---|---|
| CN | 102867550 A | 1/2013 |
| CN | 202887745 U | 4/2013 |
| CN | 103106934 A | 5/2013 |

OTHER PUBLICATIONS

International Patent Application No. PCT/CN2015/075867; Int'l Written Opinion and Search Report; dated Jul. 7, 2015; 9 pages.

* cited by examiner

PASSIVE CONTAINMENT HEAT REMOVAL SYSTEM AND CONTROL METHOD THEREOF

CROSS-REFERENCE TO RELATED APPLICATIONS

This is a national stage application in the United States of International Patent Application No. PCT/CN2015/075867, with an international filing date of Apr. 3, 2015, which claims priority to Chinese Patent Application No. 201410133614.7, filed on Apr. 3, 2014, the entire contents of which are incorporated herein by reference.

FIELD

The present invention relates to a nuclear reactor safety technology, specifically to a passive containment heat removal system, a control method thereof and a pressurized water reactor.

BACKGROUND

A nuclear reactor differs from a conventional heat source, which generates massive decay heat even after the total shutdown and suspension of the chain nuclear reaction. Once the heat cannot be removed out of the containment of the reactor, meltdown of the reactor core could occur, leading to massive release of radioactive fission product and nuclear contamination.

For a conventional active nuclear plant, depending on AC power supply, the reactor core is cooled, the decay heat is removed and the containment is cooled. When a station blackout (SBO) accident occurs, it cannot be efficient in cooling down the reactor core, removing the decay heat and cooling down the containment. In other words, the heat of the reactor core cannot be efficiently removed and therefore it may lead to severe accidents.

SUMMARY

The present application is based on findings and understanding of the following facts and problems:

When an accident happens in a nuclear reactor to e.g. an SBO accident (i.e. AC power supply is cut out over the whole plant), in order to remove the decay heat from the containment efficiently, a passive containment cooling technology is proposed in related art. For example, for an advance pressurized water reactor AP/CAP (AP1000 and CAP100), when an SBO accident occurs, the containment is cooled by spraying water from the external water tank to the outer wall of the containment.

A passive containment cooling technology by means of air cooling for an air cooling reactor with a high temperature is also proposed in the related art. The decay heat is transferred from the reactor pressure container to a water cooling wall disposed around the outer wall of the reactor pressure container and removed. The removed decay heat is cooled through an air cooling tower.

The present inventors of the application find out that the passive decay heat removal system for the air cooling reactor with the high temperature cannot be applied to such as the pressurized water reactor AP/CAP. For small reactors such as a modular air cooling reactor with a high temperature, the air cooling technology may meet the demand of decay heat removal because a power of a single reactor is only $1/15$ of the million kilowatt nuclear power. However, for the pressurized water reactors such as APCAP reactor, a power of a single reactor is larger, thus only the air cooling technology cannot meet the demand for decay heat removal.

For the pressurized water reactors such as AP/CAP reactor, after normally shutdown, the decay heat may be removed by an active water supply system. When an accident happens to lead to an SBO accident, in order to remove the decay heat of the reactor core safely, a passive cooling system (PCS system) is proposed to remove the decay heat in the related art. However, the water in the water tank of the PCS system in the related art can only be supplied for 72 hours. After 72 hours, the water must be supplemented by an active water supply pump to ensure the heat removal.

However, in the case of an SBO accident, the water supply pump cannot supply the water tank of the PCS system the water, the containment is cooled only depending on an air flow in an air duct. For example, during Fukushima nuclear disaster, the SBO accident far exceeds 72 hours resulting in no water supplement to the water tank. After the cooling water in the water tank is exhausted by spraying, a cooling capacity of the air flow in the air duct in the containment of the AP1000 reactor is about 6 MW. However, the decay heat is up to 17 MW after 72 hours and is still 6.8 MW after 30 days. Thus, for such a large shortage of heat transfer, although a heat exchange can be enhanced by optimizing the air duct and adding fins on an outside of the containment, improvement to the heat removal is still very limited. Therefore, it cannot meet the demand of the heat removal only depending on the air flow in the air duct.

Additionally, although a spraying time can be prolonged by increasing a volume of the water tank of the PCS system, it is infeasible to spray continuously the water over 30 days both in engineer and in practical considering an increased volume of the water tank of the PCS system.

In other words, the present AP/CAP series of nuclear power plants have the passive heat removal ability within the first 72 hours of an accident, but an assessment for Japan Fukushima Nuclear Disaster indicates that the reactor core cannot be cooled for a long time, thereby resulting in a series of successive disasters such as hydrogen explosion and meltdown of reactor core, due to double damages of an earthquake and a tsunami and no immediate recovery of a power supply leading to an SBO accident for 7 to 8 days. How to deal with the long-term power outage without the water supplement by the active water supply pump after 72 hours for AP/CAP series of nuclear power plants. Therefore, there is a requirement for a passive heat removal system with no time limit.

Therefore, the passive containment heat removal system in the related art, in particular the passive containment heat removal system for the pressurized water reactor needs to be improved.

The present invention is directed to solve one of the technical problems in the related art to some extent.

Therefore, one purpose of the present invention is to provide a passive containment heat removal system, which can passively remove the heat from the containment without the water supplement by the active water supply pump when the cooling water of the system is exhausted, thereby improving the safety performance.

Another purpose of the present invention is to provide a method for controlling the passive containment heat removal system described above.

Further purpose of the present invention is to provide a pressurized water reactor with the passive containment heat removal system described above.

The passive containment heat removal system according to an embodiment of the present invention comprises an outer containment; an inner containment disposed in the outer containment, and an air duct formed between the inner containment and the outer containment having an air inlet and an air outlet; a spraying assembly disposed outside the inner containment and configured to passively spray cooling water to an outer wall of the inner containment to cool the inner containment; a built-in heat exchanger disposed in the inner containment; an air cooling channel located outside the outer containment and having an air inlet and an air outlet of the air cooling channel; and an external air cooler disposed in the air cooling channel with an inlet connected with the outlet of the built-in heat exchanger via a first communication pipe and an outlet connected with the inlet of the built-in heat exchanger via a second communication pipe.

In the passive containment heat removal system according to an embodiment of the present invention, the inner containment is cooled by an air flow in the air duct and a heat-carrying agent circulated naturally between the built-in heat exchanger and the external air cooler without the water supplement by the active water supply pump after the cooling water of the spraying assembly is exhausted, thereby achieving the passive heat removal from the containment and improving the safety performance.

The passive containment heat removal system according to another embodiment of the present invention comprises a spraying passive cooling system, which comprises a spraying assembly, an outer containment, an inner containment disposed inside the outer containment and an air duct formed between the inner containment and outer containment having an air duct inlet and an air duct outlet, wherein the spraying passive cooling system is configured to cool the inner containment by spraying the cooling water to the outer wall of the inner containment and by the air flow in the air duct; and a cooling system for natural circulation of heat-carrying agent, which is configured to remove the heat inside the inner containment by the heat-carrying agent circulated naturally between the inner containment and the outer containment to cool the inner containment, and to cool the heat-carrying agent by the air cooling channel outside the outer containment.

A method for controlling the passive containment heat removal system according to an embodiment of the present invention comprises triggering automatically spraying of the cooling water to the outer wall of the inner containment to cool the inner containment by spaying and circulating naturally the heat-carrying agent between the inner containment and the outer containment to cool the inner containment when an accident happens.

A pressurized water reactor according to an embodiment of the present invention comprises the passive containment heat removal system according to an embodiment of the present invention described above.

DETAILED DESCRIPTION

Figure 1:
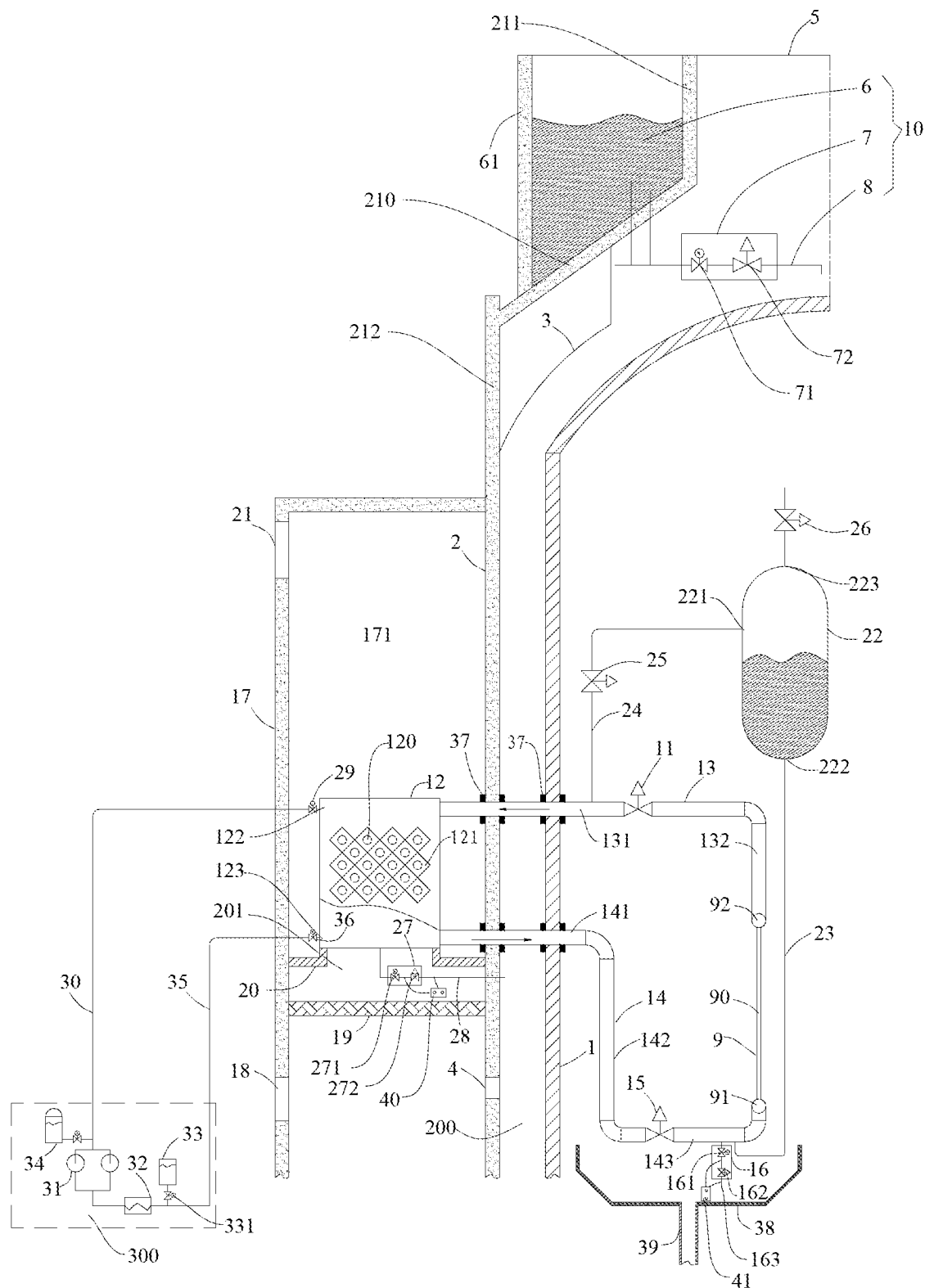
FIG. 1 is a partial view schematically showing a passive containment heat removal system according to one embodiment of the present invention.

Hereinafter, embodiments of the present invention will be described in detail with reference to accompanying drawings. The same or similar elements and the elements having same or similar functions are denoted by like reference numerals throughout the descriptions. The embodiments described herein with reference to drawings are explanatory and used to generally understand the present disclosure, which shall not be construed to limit the present disclosure.

In the descriptions of the present invention, it should be appreciated that those relative terms such as "central", "longitudinal", "lateral", "length", "width", "thickness", "above", "below", "front", "rear", "left", "right", "vertical", "horizontal", "top", "bottom", "inner", "outer", "clockwise", "counterclockwise", "axially", "radically", "circumferentially" and so forth should be construed to refer to the orientation or the positional relationship as then described or as shown in the drawings under discussion. These relative terms are merely for convenience of description and simplification of description, whereas indicate or imply particular orientation of the device or elements, or configuration or operation in particular orientation, which thus shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, such as two, three and so forth, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or interactions of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Descriptions will be made as follows for the passive containment heat removal systems according to embodiments of the present invention which is particularly applied to a pressurized water reactor e.g. an advance pressurized water reactor AP/CAP, such as an advance pressurized water reactor AP1000 and CAP100. A power for a single reactor of the pressurized water reactor is larger. The decay heat is still up to 17 MW at 72 hours after shutdown and is still 6.8 MW 30 on days after shutdown. The passive containment heat removal systems according to embodiments of the present invention can still passively remove the heat from the containment with no time limit 72 hours after shutdown without the water supplement by the active water supply pump, thereby improving the safety performance.

As shown in FIGS. 1-23, the passive containment heat removal system according to an embodiment of the present invention comprises an inner containment 1, an outer containment 2, a built-in heat exchanger 9, a spraying assembly 10, an air cooling channel 171 and an external air cooler 12.

The inner containment 1 is disposed in the outer containment 2. An air duct 200 is formed between the inner containment 1 and the outer containment 2 having an air inlet 4 and an air outlet 5. The air duct 200 is connected with the outside of the outer containment 2 by the air inlet 4 and the air outlet 5. Air is induced from the air inlet 4 to the air duct 200 and is released via the air outlet 5 from the air duct 200.

The spraying assembly 10 is disposed outside the inner containment 1, which is configured to passively spray the cooling water to an outer wall of the inner containment 1 to cool the inner containment 1. The built-in heat exchanger 9 is disposed inside the inner containment 1. The air cooling channel 171 is located outside the outer containment 2 and has an air inlet 18 and an air outlet 21 of the air cooling channel.

The external air cooler 12 is disposed in the air cooling channel 171 and located between the air inlet 18 and an air outlet 21 of the air cooling channel. The inlet of the external air cooler 12 is connected with the outlet of the built-in heat exchanger 9 by a first communication pipe 13 and the outlet of the external air cooler 12 is connected with the inlet of the built-in heat exchanger 9 by a second communication pipe 14. The heat-carrying agent is circulated naturally between the external air cooler 12 and the built-in heat exchanger 9 to remove the heat from the inner containment 1. In other words, the external air cooler 12, the built-in heat exchanger 9, the first communication pipe 13 and the second communication pipe 14 form a loop for the heat removal. The heat-carrying agent, as a circulation medium in the loop, can be water or an organic heat-carrying agent. It can be generalized understood that the organic heat-carrying agent, e.g. can be a pure organic heat-carrying agent, such as glycol and Freon, or can also be a mixture of water and an organic heat-carrying agent as long as an ice point of the mixture is so low that the mixture would not freeze under a cold weather.

Those skilled in the art should understand that the inner containment 1 can be made of for example steel and the outer containment 2 can be made of for example concrete. In the embodiments shown in FIGS. 1-23, the inner containment 1 comprises a cylinder body and an upper head disposed on the cylinder body, and the outer containment 2 has the similar shape as the inner containment 1, but the present invention is not limited to this. Members of the pressurized water reactor such as the reactor core are disposed in a reactor chamber of the inner containment 1.

When an accident happens in a nuclear power plant (for example, an SBO accident happens), the spraying assembly 10 sprays the cooling water to the inner containment 1. The cooling water after absorbing the heat is removed by the air induced from the air inlet 4 to the air duct 200 and discharged from the outer containment 2 via the air outlet 5, so that the heat can be removed passively from the inner containment 1. Furthermore, the heat-carrying agent such as water, Freon, glycol or a mixture of water and glycol is optionally circulated between the external air cooler 12 and the built-in heat exchanger 9, so that a part of the heat in the inner containment 1 can be passively removed by means of the naturally circulation of the heat-carrying agent.

In other words, another passive heat removal subsystem isolated from the spraying assembly 10 is configured to remove the heat from the inner containment 1 in combination with the spraying assembly 10. The spraying assembly 10 does not require an increased volume and an increased size, thereby reducing the whole size and weight of the system for easy assembly.

Moreover, the spraying assembly 10 can passively remove the heat from the containment with no time limit without the water supplement by the active water supply pump after the cooling water of the spraying assembly 10 is exhausted. The built-in heat exchanger 9 and the external air cooler 12 form the isolated passive heat removal subsystem, and thus radioactive substances would not be spread to the environment due to a protective effect of the external air cooler 12 if the built-in heat exchanger 9 is broken. The built-in heat exchanger 9 and the external air cooler 12 are indirectly connected with a primary steam supply system of a reactor, which would not cause additional heat consumption and reduce in thermal efficiency of an assembling unit.

Furthermore, air can be induced from the air inlet 4 to the air duct 200 and released via the air outlet 5 from the air duct to assist the heat removal after the cooling water of the spraying assembly 10 is exhausted. Meanwhile, the built-in heat exchanger 9 and the external air cooler 12 form the isolated passive heat removal subsystem to remove the heat by naturally circulation of the heat-carrying agent so as to remove more heat and meet the demand of the heat removal for a large power reactor such as AP/CAP nuclear reactor when an accident happens, in particular in the first 72 hours of the accident, for example within up to 20-30 days, thereby improving the safety performance.

In some embodiments, when an accident happens, the spraying assembly 10 sprays the cooling water to the outer wall of the inner containment 1 and at the same time a heat-carrying agent is circulated naturally between the external air cooler 12 and the built-in heat exchanger 9 to cool the inner containment 1 so that an amount of spraying water of the spraying assembly is reduced per unit time and a spraying time is extended with the help of the natural circulation of the heat-carrying agent. After the cooling water of the spraying assembly is exhausted, the inner containment is cooled by the air flow in the air duct and the heat-carrying agent naturally circulated between the external air cooler 12 and the built-in heat exchanger 9. In the first 72 hours of the accident, e.g. within 20-30 days, the heat in the inner containment 1 can be safely removed, thereby avoiding that the temperature and/or the pressure in the inner containment 1 exceed the designated threshold value (e.g. a designated temperature threshold value is normally 150° C. and a designated pressure threshold value is normally 0.5 MPa) in the inner containment 1 to improve the safety performance.

It will be appreciated that, when the inner containment 1 is cooled by spraying the cooling water, the cooling water forms a water membrane on the outer wall of the inner containment 1 to absorb the heat and then be evaporated. The evaporated cooling water can be drained out via the air outlet 5 by the air induced from air inlet 4 into the air duct 200. After the cooling water is exhausted, the air induced from air inlet 4 into the air duct 200 performs a heat exchange with the inner containment 1 to absorb the heat therein and is released via the air outlet 5.

In some embodiments, when an accident happens, the spraying assembly 10 sprays the cooling water to the outer wall of the inner containment 1 to cool the inner containment and at the same time the heat-carrying agent is not circulated between the external air cooler 12 and the built-in heat exchanger 9, and after the cooling water of the spraying assembly is exhausted, the inner containment is cooled by the air flow in the air duct and the heat-carrying agent naturally circulated between the external air cooler 12 and the built-in heat exchanger 9. In other words, the heat-carrying agent is not circulated naturally during the process of spraying cooling water, because the cooling water has met the demand of the heat removal, when the cooling water is exhausted normally in the first 72 hours of the accident, the circulation of the heat-carrying agent naturally starts up to meet the demand of the heat removal because the air flow in the air duct cannot meet the demand, thereby ensuring safety.

In some optional embodiments, when an accident happens, the spraying assembly 10 sprays the cooling water to the outer wall of the inner containment 1 to cool the inner containment; and the heat-carrying agent is circulated naturally between the external air cooler and the built-in heat exchanger only when the temperature and/or the pressure of the inner containment exceeds the designated threshold value during the process of spraying cooling water, and after the cooling water of the spraying assembly is exhausted, the inner containment is cooled by the air flow in the air duct and the heat-carrying agent naturally circulated between the external air cooler 12 and the built-in heat exchanger 9.

In some preferred embodiments, when an accident happens, the spraying assembly 10 sprays the cooling water to the outer wall of the inner containment 1 to cool the inner containment; after the cooling water of the spraying assembly is exhausted, the inner containment is cooled by the air flow in the air duct; and the heat-carrying agent is circulated naturally between the external air cooler and the built-in heat exchanger only when the temperature and/or the pressure of the inner containment exceeds the designated threshold value during the process of spraying cooling water as well as after the cooling water is exhausted. In other words, the natural circulation of the heat-carrying agent is cooperated with the spraying assembly to cool down the inner containment 1. No matter whether the spraying water is exhausted, the natural circulation of the heat-carrying agent will be started up as long as the temperature and/or the pressure in the inner containment 1 exceed the designated threshold value, so that more heat is removed from the inner containment 1. When the temperature and the pressure in the inner containment 1 are lower than the designated threshold value and no pressure difference is produced, the natural circulation of the heat-carrying agent would not be started up, thereby improving the safety performance, making an easy and convenient control and making a low cost.

Preferably, an air deflector 3 is disposed in the air duct 200 for inducing the air flow in the air duct 200, in order to improve heat transfer efficiency and heat removal efficiency.

Figure 2:
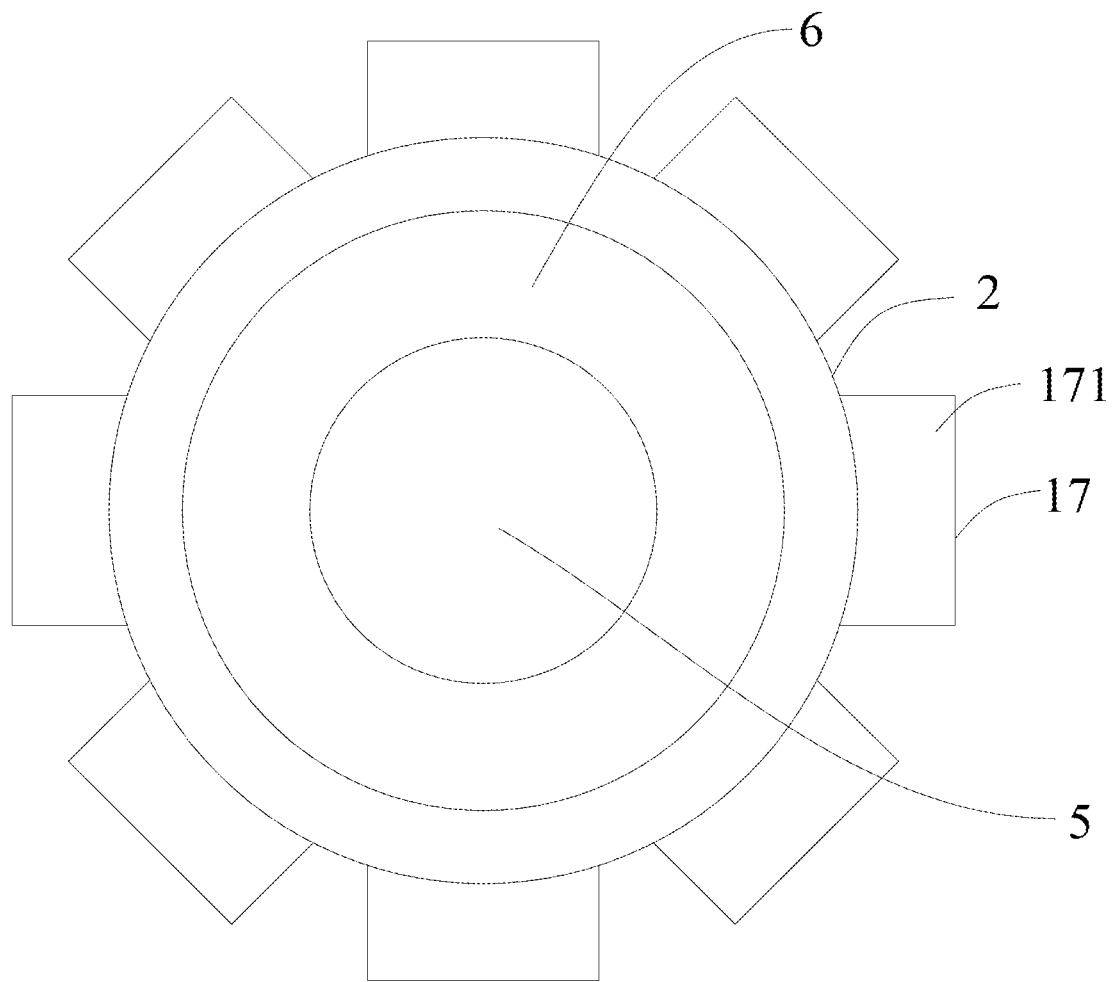
FIG. 2 is a vertical view schematically showing a passive containment heat removal system according to one embodiment of the present invention.

Reference is made to FIGS. 1 and 2 hereafter to describe the passive containment heat removal system according to one embodiment of the present invention.

As shown in FIGS. 1 and 2, the passive containment heat removal system according to one embodiment of the present invention comprises an inner containment 1, an outer containment 2, a built-in heat exchanger 9, a spraying assembly 10, an air cooling channel 171 and an external air cooler 12.

Figure 23:
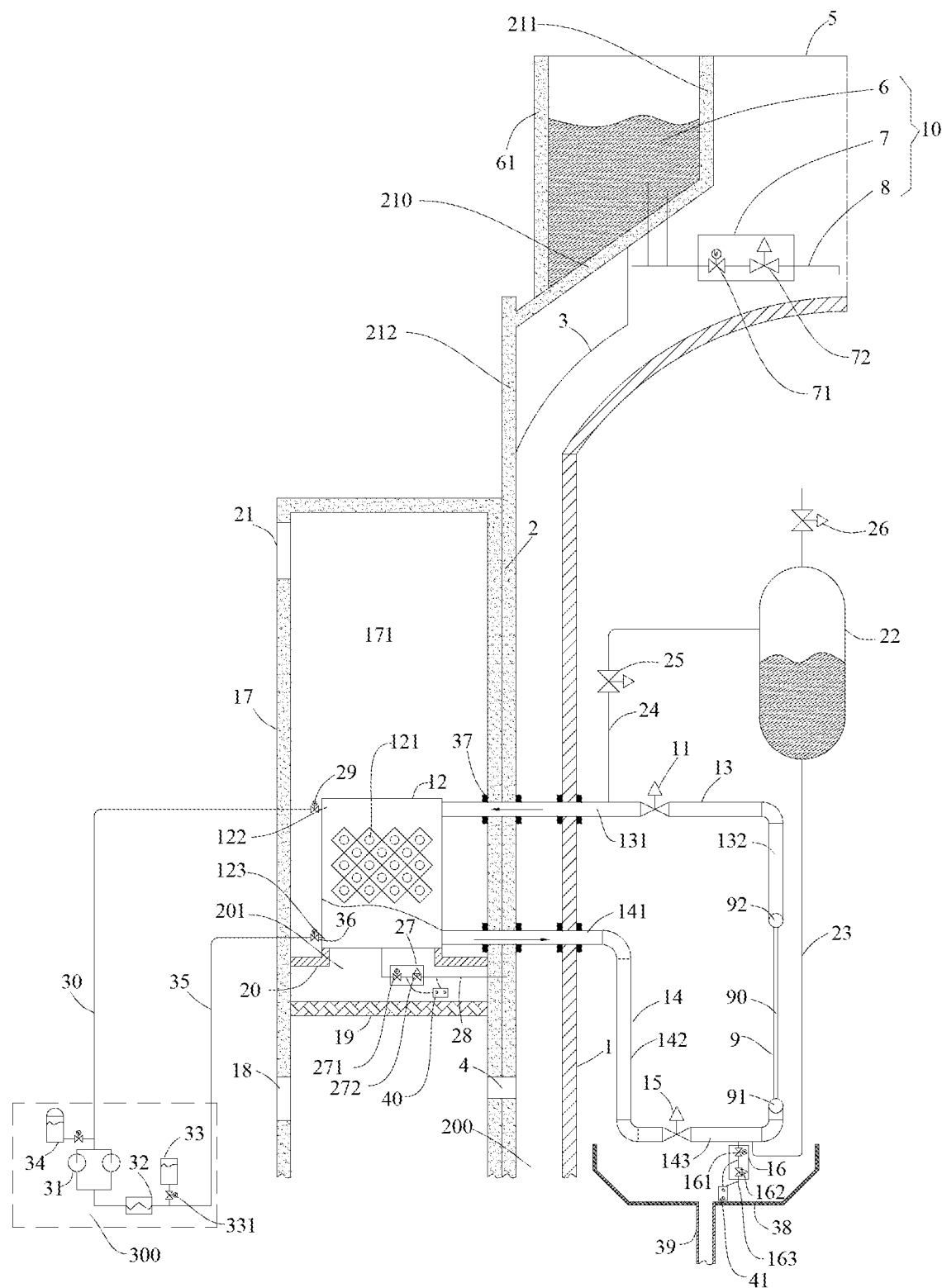
FIG. 23 is a partial view schematically showing a passive containment heat removal system according to another embodiment of the present invention.

The inner containment 1 is disposed in the outer containment 2. The air duct 200 is formed in a space between the inner containment 1 and the outer containment 2. The air cooling channel 171 is defined by a chimney wall 17 and an outer wall of the outer containment 2, so that manufacture cost is reduced. It is to be appreciated by those skilled in the art that the present invention is not limited to this. For example, as shown in FIG. 23, the air cooling channel 171 can be defined by an isolated chimney wall 17. In other words, the air cooling channel 171 is defined by the chimney isolated from the outer containment 2.

The air duct 200 has an air inlet 4 and an air outlet 5. The air inlet 5 and the air outlet 5 are formed on the outer wall of the outer containment 2. Preferably, the air outlet 5 is formed on a top of the outer containment 2 and the air inlet 4 is formed on a side wall of the outer containment 2. The air deflector 3 is disposed at an upper part of the air duct 200 and used to induce the air to the air outlet 5 to increase the heat transfer efficiency and the heat removal efficiency.

The spraying assembly 10 is disposed outside the inner containment 1 to passively spray the cooling water to the outer wall of the inner containment 1 and thus cool the inner containment 1 down. The built-in beat exchanger 9 is disposed in the inner containment 1. The air cooling channel 171 is located outside the outer containment 2 having an air inlet 18 and an air outlet 21 of the air cooling channel.

The external air cooler 12 is disposed in the air cooling channel 171 between the air inlet 18 and an air outlet 21 of the air cooling channel. The inlet of the external air cooler 12 is communicated with the outlet of the built-in heat exchanger 9 by the first communication pipe 13 and the outlet of the external air cooler 12 is communicated with the inlet of the built-in heat exchanger 9 by the second communication pipe 14.

As shown in FIG. 1, the chimney wall 17 comprises a side wall and a top wall. The upper part of the air cooling channel 171 is sealed by the top wall of the chimney wall 17. The air inlet 18 and the air outlet 21 of the air cooling channel are formed on the side wall of the chimney wall 17. The air inlet 18 of the air cooling channel is adjacent to the lower part of the chimney wall 17 and the air outlet of the air cooling channel 21 is adjacent to the upper part of the chimney wall 17. The air inlet 4 is adjacent to the lower part of the outer containment 2 to communicate the air duct 200 with the outside of the outer containment 2. In some optional embodiments, the air inlet 4 can be adjacent to the upper part of the outer containment 2 or be located on the middle part of the outer containment 2.

In other words, the air is induced into the lower part of the air cooling channel 171 via the air inlet 18 of the air cooling channel from the external environment. A part of the air flows upward, performs a heat exchange with the external air cooler 12 and is released via the air outlet 21 of the air cooling channel. Another part of the air is induced into the air duct 200 via the air inlet 4 and released out via the air outlet 5.

As shown in FIG. 2, a plurality of the air cooling channels 171 are provided and arranged at regular intervals in a circumferential direction of the outer containment 2, a plurality of the external air coolers 12 are provided and disposed correspondingly in the plurality of the air cooling channels 171, and a plurality of the built-in heat exchangers 9 are provided, each of the built-in heat exchangers 9 being connected with at least one of the external air coolers 12. Preferably, the number of the built-in heat exchanger 9 can be less than the external air cooler 12, for example, two the external air coolers 12 are connected with one the built-in heat exchanger 9. In this case, the number of the heat exchange pipe of the built-in heat exchanger 9 can be increased so that the heat transfer ability of the single built-in heat exchanger 9 matches with that of the two external air coolers 12.

As shown in FIG. 1, advantageously, a level of the top of the external air cooler 12 is above a level of the top of the built-in heat exchanger 9, and a level of the bottom of the external air cooler 12 is above a level of the bottom of the built-in heat exchanger 9. In other words, the external air cooler 12 is above the built-in heat exchanger 9. Thus, the heat-carrying agent in the built-in heat exchanger 9 has a reduced density after being heated by the heat of the inner containment 1 and flows upward into the external air cooler 12 with buoyancy. The heat-carrying agent in the external air cooler 12 has an increased density after being cooled by the air and flows downward into the built-in heat exchanger 9, thereby making it easy to establish the natural circulation of the heat-carrying agent and improving an effect of the heat removal.

In some specific embodiments, as shown in FIG. 1, the external air cooler 12 can be a fin type of heat exchanger, for example the external air cooler 12 comprises an outer heat exchange pipe 120 and fins 121 are provided between outer heat exchange pipes to increase a heat exchange area with the air and thus improve a cooling effect of the air on the external air cooler 12. The external air cooler can further comprises an upper header and a lower header.

The built-in heat exchanger 9 comprises an inlet header 91, an outlet header 92 and an inner heat exchange pipe 90 for connecting between the inlet header 91 and the outlet header 92. The outlet header 92 is located below the inlet header 91. The inlet header 91 is communicated with the outlet of the external air cooler 12 by the second communication pipe 14. The outlet header 92 is communicated with the inlet of the external air cooler by the first communication pipe 13. The inner heat exchange pipe 90 can be a smooth pipe and also be an enhanced heat exchange pipe with an enhanced heat exchange member such as a fin.

It is to be appreciated by those skilled in the art that, the external air cooler 12 and the built-in heat exchanger 9 are not limited to the constructions described above, for example, the external air cooler 12 may has the same structure with the built-in heat exchanger 9, for example, the external air cooler 12 is a parallel flow heat exchanger.

The inner part of the first communication pipe 13 is communicated with outlet header 92 and the outer part of the first communication pipe 13 is communicated with the inlet of the external air cooler 12 via the inner containment 1 and the outer containment 2. The inner part of the second communication pipe 14 is communicated with inlet header 91 and the outer part of the second communication pipe 14 is communicated with the outlet of the external air cooler 12 via the inner containment 1 and the outer containment 2. To ensure sealing when the first communication pipe 13 and the communication pipe 14 pass through the inner containment 1 and the outer containment 2, penetrating pieces 37 are respectively disposed inside the wall of the inner containment 1 and the outer containment 2. The first communication pipe 13 and the communication pipe 14 pass through the penetrating pieces 37 respectively.

A first pneumatic valve 11 is disposed at the first communication pipe 13 and a second pneumatic valve 15 is disposed at the second communication pipe 14. Specifically, the first communication pipe 13 is generally L-shape and comprises a first horizontal pipe segment 131 and a first vertical pipe segment 132 connected with the first horizontal pipe segment 131. The first horizontal pipe segment 131 is connected with the inlet of the external air cooler 12 and the first vertical pipe segment 132 is connected with the outlet header 92. The first pneumatic valve 11 is disposed at first horizontal pipe segment 131.

The second communication pipe 14 comprises a second horizontal pipe segment 141, a third horizontal pipe segment 143 and a second vertical pipe segment 142 for connecting between the second communication pipe 141 and the third horizontal pipe segment 143, and a second horizontal pipe segment 141, a third horizontal pipe segment 143 and a second vertical pipe segment 142 are connected with one another in sequence. The second horizontal pipe segment 141 is connected with the outlet of the external air cooler 12 and the third horizontal pipe segment 143 is connected with the inlet header 91. The second pneumatic valve 15 is disposed in the third horizontal pipe segment 143.

The first pneumatic valve 11 and the second pneumatic valve 15 may keep open. When the pressurized water reactor is normal run, because the built-in heat exchanger 9, the external air cooler 12, the first communication pipe 13 and the second communication pipe 14 is filled with the heat-carrying agent to make the temperature in the inner containment 1 low and to make a driving pressure head caused by density difference and temperature difference low, so that the natural circulation cannot be established easily. When an accident happens, the heat-carrying agent in the built-in heat exchanger 9 is heated to produce an increased density difference and an increased pressure head, so that the heat-carrying agent is naturally passively circulated among the built-in heat exchanger 9, the external air cooler 12, the first communication pipe 13 and the second communication pipe 14 to remove the heat from the inner containment 1.

Alternatively, the first pneumatic valve 11 and the second pneumatic valve 15 may keep close. In other words, when the pressurized water reactor is normal run, the first communication pipe 13 is cut off by the first pneumatic valve 11 and the second communication pipe 14 is cut off by the second pneumatic valve 15. The heat-carrying agent is unable to be circulated among the built-in heat exchanger 9, the external air cooler 12, the first communication pipe 13 and the second communication pipe 14. In one preferred embodiment, when the pressurized water reactor is normal run in a cold region, the heat-carrying agent is drained from the inner heat exchanger 9, external air cooler 12, the first communication pipe 13 and the second communication 14 to avoid the heat-carrying agent freezing in the built-in heat exchanger 9, the external air cooler 12, the first communication pipe 13 and the second communication pipe 14. When an accident happens, the first pneumatic valve 11 and the second pneumatic valve 15 is open, so that the heat-carrying agent is naturally circulated among the built-in heat exchanger 9, the external air cooler 12, the first communication pipe 13 and the second communication pipe 14 to remove the heat. Therefore, the passive system according to an embodiment of the present invention can be applied to a cold region, thereby improving applicability.

As shown in FIG. 1, in a preferred embodiment, the passive containment heat removal system according to an embodiment of the present invention further comprises a first drainage pipe 28, a first drainage valve 27 disposed at the first drainage pipe 28, a second drainage pipe 163 and a second drainage valve 16 disposed at the second drainage valve 163.

The first end of the first drainage pipe 28 is connected with the external air cooler 12 and the second end of the first drainage pipe 28 is connected with the air duct 200 between the inner containment 1 and the outer containment 2. The second drainage pipe 163 is disposed in the inner containment 1 and connected with the second communication pipe 14. More specifically, the first drainage pipe 28 is communicated with the bottom of the external air cooler 12 and the second drainage pipe 163 is communicated with the third horizontal pipe segment 143.

The first drainage pipe 28 can be used to drain the heat-carrying agent from the external air cooler 12 and the second drainage pipe 163 can be used to drain the heat-carrying agent from the external air cooler 12, the first communication pipe 13 and the second communication pipe 14.

For example, in a cold region or when the weather becomes cold, the heat-carrying agent can be drained from the heat removal loop formed from the built-in heat exchanger 9, the external air cooler 12, the first communication pipe 13 and the second communication pipe 14 via the first drainage pipe 28 and the second drainage pipe 163 to avoid freezing.

To easily drain the heat-carrying agent from the heat removal loop as describe above, in some specific embodiment, the first communication pipe 13 comprises the first horizontal pipe segment 131 and the first vertical pipe segment 132. The external air cooler 12 and the first horizontal pipe segment 131 are aslant arranged with respect to a horizontal direction.

The second communication pipe 14 comprises the second horizontal pipe segment 141, the second vertical pipe segment 142 and a third horizontal pipe segment 143. The built-in heat exchanger 9, the second horizontal pipe segment 141 and the third horizontal pipe segment 143 are aslant arranged with respect to a horizontal direction.

More specifically, in FIG. 1, for a part of the first horizontal pipe segment 131 located between the first pneumatic valve 11 and the external air cooler 12, the right end is higher than the left part so that the heat-carrying agent in this part easily flows to the external air cooler 12 to being drained from the first drainage valve 27. The external air cooler 12 is aslant arranged, which means that horizontal elements of the external air cooler 12 are aslant arranged, e.g. the upper header 122 and the lower header 123 of the external air cooler 12 are aslant arranged. For example, in FIG. 1, the right parts of the upper header 122 and the lower header 123 are higher than the left parts of the upper header 122 and the lower header 123, which is beneficial to drain the water in the external air cooler via the first drainage valve 27. Furthermore, the second horizontal pipe segment 141 can be aslant arranged, i.e. the right part of the second horizontal pipe segment 141 is higher than its left part.

when the second drainage valve 16 is disposed, the first horizontal pipe segment 131 is partially aslant arranged between the first pneumatic valve 11 and the first vertical pipe segment 132, i.e. the left end of this part is higher than its right end as shown in FIG. 1. The third horizontal pipe segment 143 is also aslant arranged, i.e. the left end of the third horizontal pipe segment 143 is higher than its right end as shown in FIG. 1. Furthermore, the inlet header 91 and the outlet header 92 of the built-in heat exchanger 9 are aslant arranged so as to drain the heat-carrying agent via the second drainage valve 16 easily.

It can be appreciated that when the second drainage valve 16 is arranged, the left end of the second horizontal pipe segment 141 can be higher than its right end, thereby draining the heat-carrying agent therein via the second drainage valve 16. Furthermore, the left end of the first horizontal pipe segment 131 can be also higher than its right end.

Preferably, the first drainage valve 27 comprises a first electric drainage valve 271, a first pneumatic drainage valve 272 and a first leakage monitoring device 40 which are connected with each other in series.

The first leakage detecting device 40 is connected with the first drainage pipe at a first leakage detecting site between the first electric drainage valve 271 and the first pneumatic drainage valve 272 and at a second leakage detecting site between the first pneumatic drainage valve 272 and the second end of the first drainage pipe 28.

Both the first electric drainage valve 271 and the first pneumatic drainage valve 272 is close during normal nm, the first leakage monitoring device 40 can monitor a operation state of the first electric drainage valve 271 and the first pneumatic drainage valve 272 in real time. If an abnormal signal of the first leakage monitoring site between the first electric drainage valve 271 and the first pneumatic drainage valve 272 is generated, the first electric drainage valve 271 breaks down. If an abnormal signal of the second leakage monitoring site behind the first pneumatic drainage valve 272 is generated, the first electric drainage valve 271 and the first pneumatic drainage valve 272 breaks down.

Similarly, the second drainage valve 16 comprises a second electric drainage valve 161, a second pneumatic drainage valve 162 and a second leakage monitoring device 41 which are connected with each other in series.

The second leakage detecting device 41 is connected with the second drainage pipe at a third detecting site between the second electric drainage valve 161 and the second pneumatic drainage valve 162 and at a fourth detecting site between the second pneumatic drainage valve 162 and a free end of the second drainage pipe 163.

Both the second electric drainage valve 161 and the second pneumatic drainage valve 162 are close during normal nm, the second leakage monitoring device 41 can monitor a operation state of the second electric drainage valve 161 and the second pneumatic drainage valve 162 in real time. If an abnormal signal of the third leakage monitoring site between the second electric drainage valve 161 and the second pneumatic drainage valve 162 is generated, the second electric drainage valve 161 breaks down. If an abnormal signal of the fourth leakage monitoring site behind the second pneumatic drainage valve 162 is generated, the second electric drainage valve 161 and the second pneumatic drainage valve 162 break down.

A condensate water collector 38 is disposed in the inner containment 1. The condensate water collector 38 is disposed below the built-in heat exchanger 9 and is disposed below the second vertical pipe segment 142 and the first vertical pipe segment 132 to collect the condensed water of the built-in heat exchanger 9, the first communication pipe 13 and the second communication pipe 14. The condensate water collector 38 has a water outlet connected with a drainpipe 39. The condensed water of the condensate water collector 38 can be drained into a built-in refueling water tank (not shown) of the inner containment 1 via the drainpipe 39.

In some preferred embodiments, as shown in FIG. 1, an expansion tank 22 with a first opening 221 and a second opening 222 is disposed in the inner containment 1. The first opening 221 is connected with a first communication pipe 13 via a venting pipe 24 and the second opening 222 is connected with a second communication pipe 14 via a connecting pipe 23. Advantageously, the bottom of the expansion tank 22 is above the built-in heat exchanger 9 and the external air cooler 12, i.e. a level of the expansion tank 22 is higher than levels of the built-in heat exchanger 9, the external air cooler 12, the first communication pipe 13 and the second communication pipe 14. More specifically, a first end of the venting pipe 24 is connected with the first opening 221 and a second end of the venting pipe 24 is connected with the first horizontal pipe segment 131. The venting pipe 24 is connected with the first horizontal pipe segment 131 at position between the first pneumatic valve 11 and the external air cooler 12. A first end of the connecting pipe 23 is connected with a second opening 222 and a second end of the connecting pipe 23 is connected with the third horizontal pipe segment 143. The connecting pipe 23 is connected with the third horizontal pipe segment 143 at position between the second pneumatic valve 15 and the inlet header 91.

Preferably, a first venting valve 25 is disposed at the venting pipe 24. The expansion tank 22 has a third opening 223 at the top thereof is connected with a second venting valve 26.

The expansion tank 22 can provide the heat removal loop formed from the built-in heat exchanger 9, the external air cooler 12, the first communication pipe 13 and the second communication pipe 14 with an original heat-carrying agent and can provide a buffer for the volume expansion of the heat removal loop during run. An amount of the heat-carrying agent in the expansion tank 22 is sufficient for a load of the heat-carrying agent of the heat removal loop and a load of the heat-carrying agent of the heat removal loop after the pipes between the second pneumatic valve 15 and the first pneumatic valve 11 via the external air cooler 12 are drained. To avoid that non-condensate gas is accumulated in the heat removal loop, the heat removal loop is provided with an air vent. The air of the heat removal loop is communicated with the expansion tank 22 via the venting pipe 24 and enters into the inner containment via the second venting valve 26; so that the air of the heat removal loop is released without lost of the heat-carrying agent due to leaking.

The passive containment heat removal system according to an embodiment of the present invention further comprises an auxiliary circulation system 300 for the heat-carrying agent disposed outside the outer containment 2, e.g. in an auxiliary building outside the outer containment 2. The auxiliary circulation system 300 for the heat-carrying agent is connected with the external air cooler 12 to supply the heat-carrying agent to the external air cooler 12.

Especially when the heat-carrying agent is water, the auxiliary circulation system 300 for the heat-carrying agent comprises a preheated 32 disposed at a first heat-carrying agent pipe 35, a heat-carrying agent tank 34 connected with a second heat-carrying agent pipe 30, and a circulation pump 31 with a first port and a second port, the first port being connected with the external air cooler 12 via a first valve 36 and the first heat-carrying agent pipe 35, the second port being connected with the external air cooler 12 via a second valve 29 and a second heat-carrying agent pipe 30.

The heat-carrying agent tank 34 is adjacent to the inlet of the circulation pump 31 to supply water to the heat removal loop. Working medium flows by the circulation pump 31 and the water supply can be achieved in the heat removal loop by the circulation pump 31, wherein a water quality is maintained by means of adding an additive. The auxiliary circulation system 300 for the heat-carrying agent can be arranged in the auxiliary building and can share the same water source with the spraying assembly 100 when necessary.

Preferably, the auxiliary circulation system 300 for the heat-carrying agent further comprises a feed tank 33 connected with the first heat-carrying agent pipe 35 via a control valve 331.

In some specific embodiments, as shown in FIG. 1, a supporting component 20 is disposed on the inner wall of the air cooling channel 171, the external air cooler 12 is installed on the supporting component 20 for easy installation. The supporting component 20 is an annular frame with a central through-hole 201. The central through-hole 201 is face to the external air cooler 12 in a vertical direction. The supporting component 20 can have annular shape or square ring shape according to a shape of cross section of the air cooling channel 117.

A filter 19 is disposed in the air cooling channel 171 between the air inlet 18 of the air cooling channel and the external air cooler 12 to filter the air induced into the air cooling channel 171 via the air inlet 18 of the air cooling channel and into the external air cooler 12. It is appreciated that the external air cooler 12 and the supporting component 20 have enough sealing property and the supporting component 20 and the inner wall of the air cooling channel 171 have enough sealing property to avoid air leakage in order to further improve the heat exchange effect of the air and the external air cooler 12.

The spraying assembly 10 comprises a water tank 6 disposed outside the outer containment 2, a spraying pipe 8 and a spraying valve 7. In the embodiment shown in FIG. 1, the water tank 6 is formed by the water tank wall 61 disposed on the outer wall of the upper part of the outer containment 2 and the wall of the outer containment 2, e.g. by integral concrete-pouring of the water tank wall 61 and the outer containment 2. As shown in FIG. 1, the outer containment 2 is provided with a cone shape segment 210. The upper segment of the cone shape segment 210 is connected with the upper tube segment 211. The opening of the upper part of the upper tube segment 211 forms the air outlet 5 and the lower part of the cone shape segment 210 is connected with the lower tube segment 212. The water tank is formed from the water tank wall 61 and the outer wall of the cone shape segment 210. The upper tube segment 211 and the air outlet 5 are surrounded by the water tank wall 61 and the water tank 6 is formed integrally in the outer containment 2, thereby reducing the whole weight of the water tank 6, reducing the space required and reducing the cost.

The first end of the spraying pipe 8 is connected with the water tank 6 and the second end of the spraying pipe 8 extends to the top of the inner containment 1. The spraying valve 7 is disposed at the spraying pipe 8. The spraying valve 7 is close when the pressurized water reactor is normal run. The spraying valve 7 is open when an accident happens and the water tank 6 sprays passively the water to the outer wall of the inner containment 1 via the spraying pipe 8 with the gravity. The water absorbing heat is drained out via the air outlet 5 to remove the heat of the inner containment 1.

It can be appreciated certainly that, the water tank 6 is not limited to being disposed on the outer containment 2 and can be isolated from the outer containment 2 and disposed above the outer containment 2.

Furthermore, in the embodiment shown in FIG. 1, the air inlet 4 is adjacent to the lower part of the outer containment 2. So no air deflector 3 may be disposed.

Figure 3:
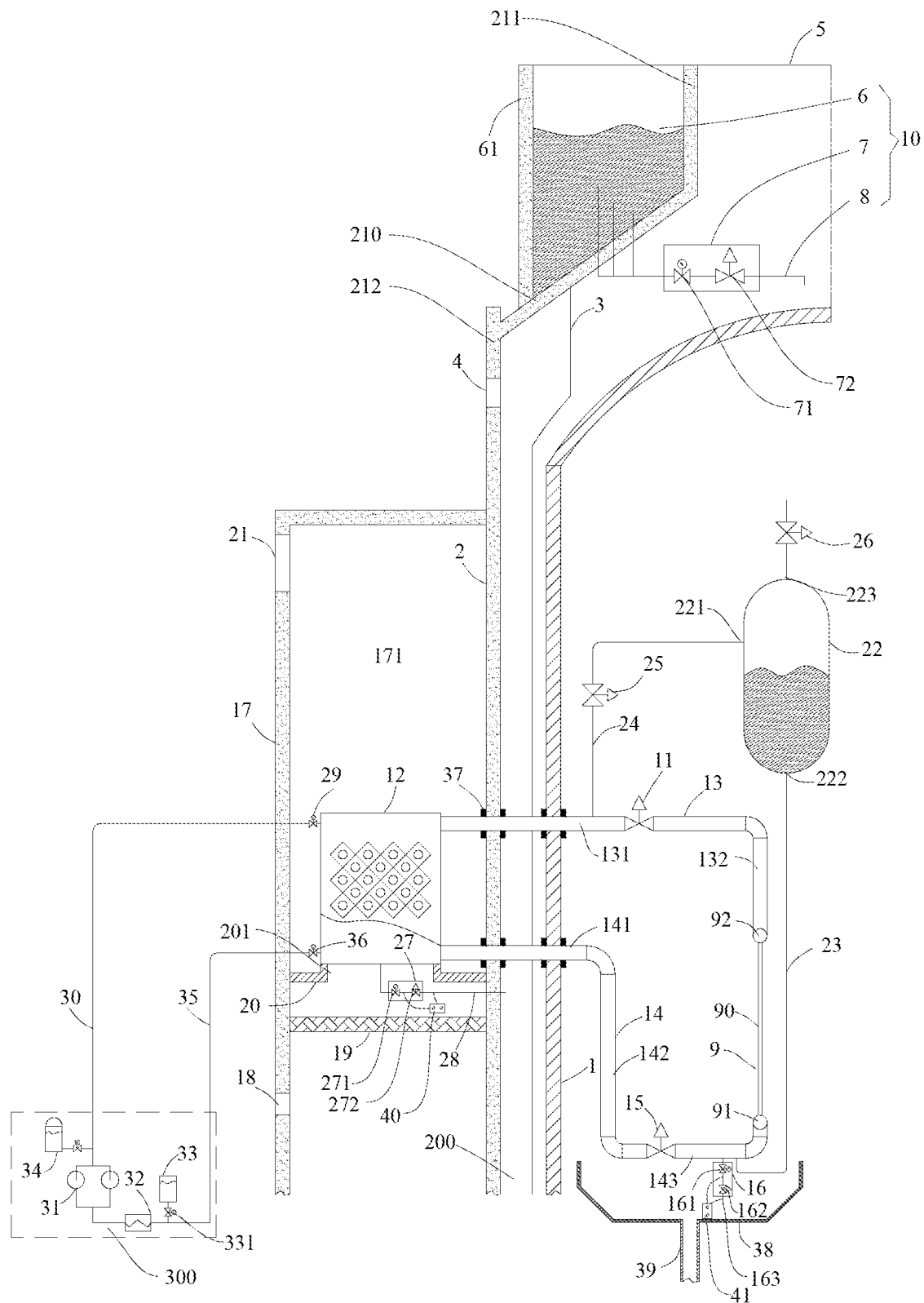
FIG. 3 is a partial view schematically showing a passive containment heat removal system according to one embodiment of the present invention.

FIG. 3 shows the passive containment heat removal system according to other embodiments. As shown in FIG. 3, in the embodiment, the air inlet 4 is above the upper part of the air cooling channel 171. The air inlet 18 and the air outlet 21 of the air cooling channel are formed on the chimney wall 17.

The other construction and operation of the passive containment heat removal system shown in FIG. 3 is similar to the embodiment shown in FIG. 1. No detail descriptions will be made herein.

Figure 4:
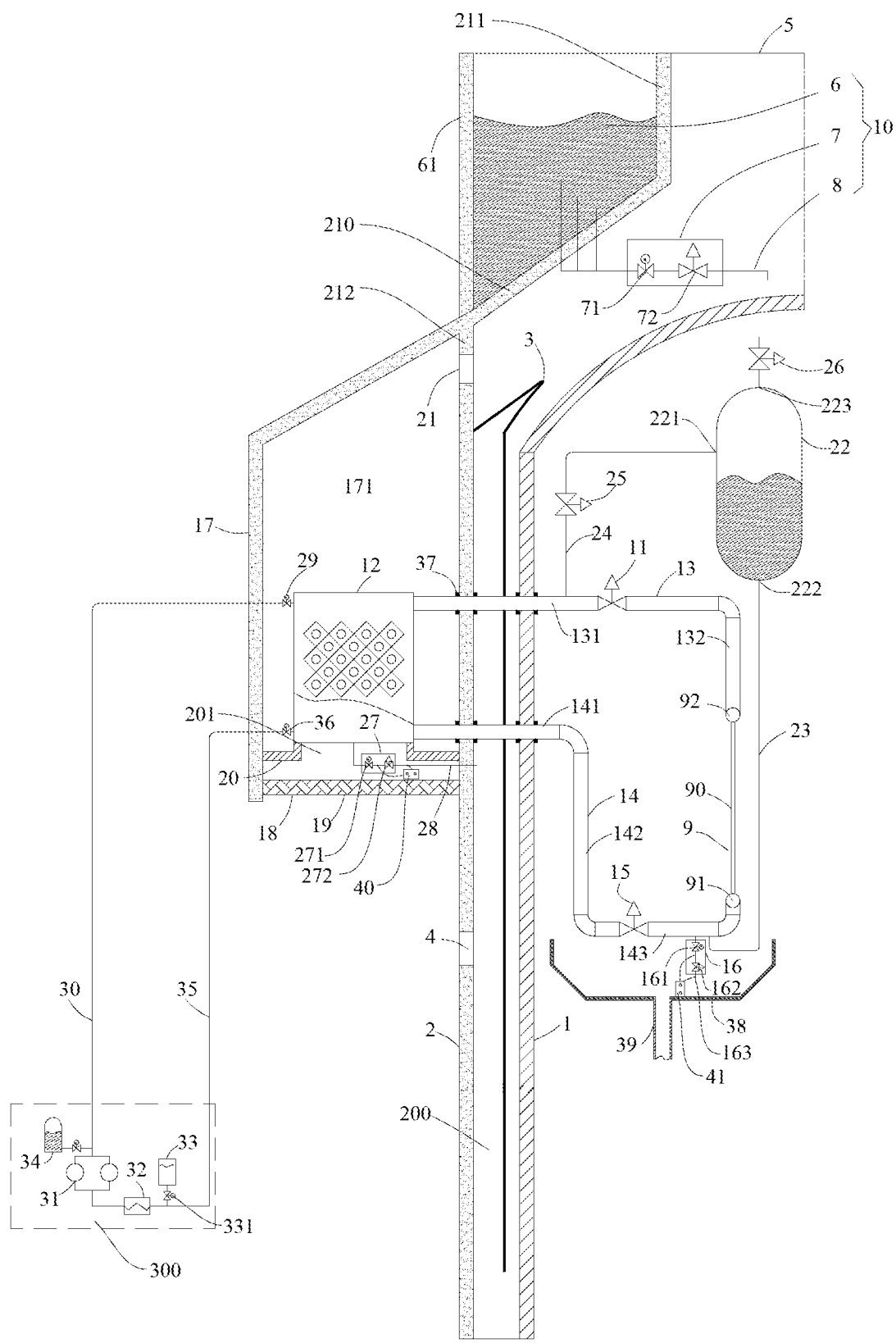
FIG. 4 is a partial view schematically showing a passive containment heat removal system according to one embodiment of the present invention.

FIG. 4 shows the passive containment heat removal system according to further embodiments. As shown in FIG. 4, the lower part of the air cooling channel 171 is open to form the air inlet 18 of the air cooling channel. The air outlet 21 of the air cooling channel is formed on the outer wall of the outer containment 2. The air cooling channel 171 is connected with the air duct 200 via the air outlet 21 of the air cooling channel. The air inlet 4 is below the lower part of the air cooling channel 171. Besides, the air deflector 3 is below the air outlet 21 of the air cooling channel and is adjacent to the inner wall of the inner containment 1 to induce the air from the air outlet 21 of the air cooling channel to the air outlet 5 of the air cooling channel.

Therefore, after a heat exchange with the external air cooler 12, the air from the air inlet 18 of the air cooling channel to the air cooling channel 171 is induced to the air duct 200 via the air outlet 21 of the air cooling channel and released to atmosphere via the air outlet 5.

The air cooling channel 171 in the embodiment shares the same air outlet with the air duct 200, thereby dramatically reducing the height of the chimney wall 17 and dramatically reducing its entire weight accordingly with meeting the height required for natural circulation of the air.

In the embodiments shown in FIG. 1-4, the first communication pipe 13 and the second communication pipe 14 penetrate the walls of inner containment 1 and the outer containment 2 respectively. For example, the penetrating piece 37 (the first penetrating piece) is disposed in the wall of the inner containment 1 and the penetrating piece 37 (the second penetrating piece) is disposed in the wall of outer containment 2. The first communication pipe 13 and the second communication pipe 14 pass through the penetrating piece 37 and extend from the inner containment 1 to the outside of the outer containment 2. Preferably, the first penetrating piece and the second penetrating piece are the same penetrating piece, i.e. the two penetrating pieces are formed integrally.

When the heat-carrying agent is water, glycol or the mixture thereof, the embodiments shown in FIG. 1-4 are particularly applied.

Figure 5:
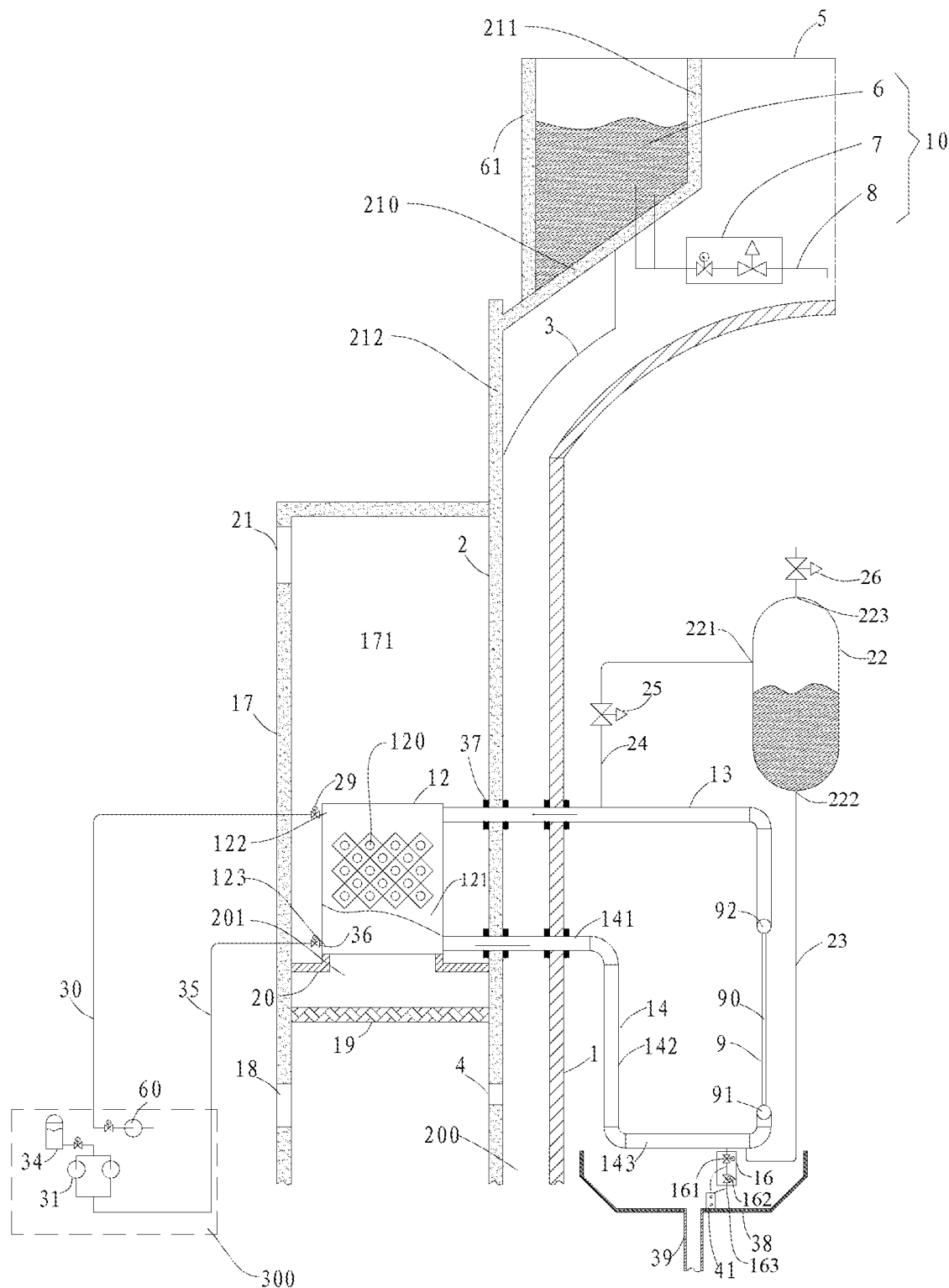
FIG. 5 is a vertical schematic view schematically showing a passive containment heat removal system according to one embodiment of the present invention.

The passive containment heat removal system according to further embodiments of the present invention is shown in FIG. 5. As shown in FIG. 5, the auxiliary circulation system 300 for the heat-carrying agent comprises the heat-carrying agent tank 34 connected with the external air cooler 12 via the circulation pump, the first heat-carrying agent pipe 35 and the first valve 36, the circulation pump 31, and a vacuum pump 60 is connected with the external air cooler 12 via the second heat-carrying agent pipe 30 and the second valve 29. Furthermore, in the embodiment shown in FIG. 5, no valve is disposed in the first communication pipe 13 and the second communication pipe 14. E.g., when the heat-carrying agent is Freon, it is beneficial to simplification of construction and reduction in cost. The other constructions of the passive containment heat removal system shown in FIG. 5 are similar to the embodiment shown in FIG. 1. No detail descriptions will be made herein. It is appreciated that when the heat-carrying agent is Freon the circulation pump in the embodiment shown in FIG. 5 can be omitted to further simplify the construction.

Figure 6:
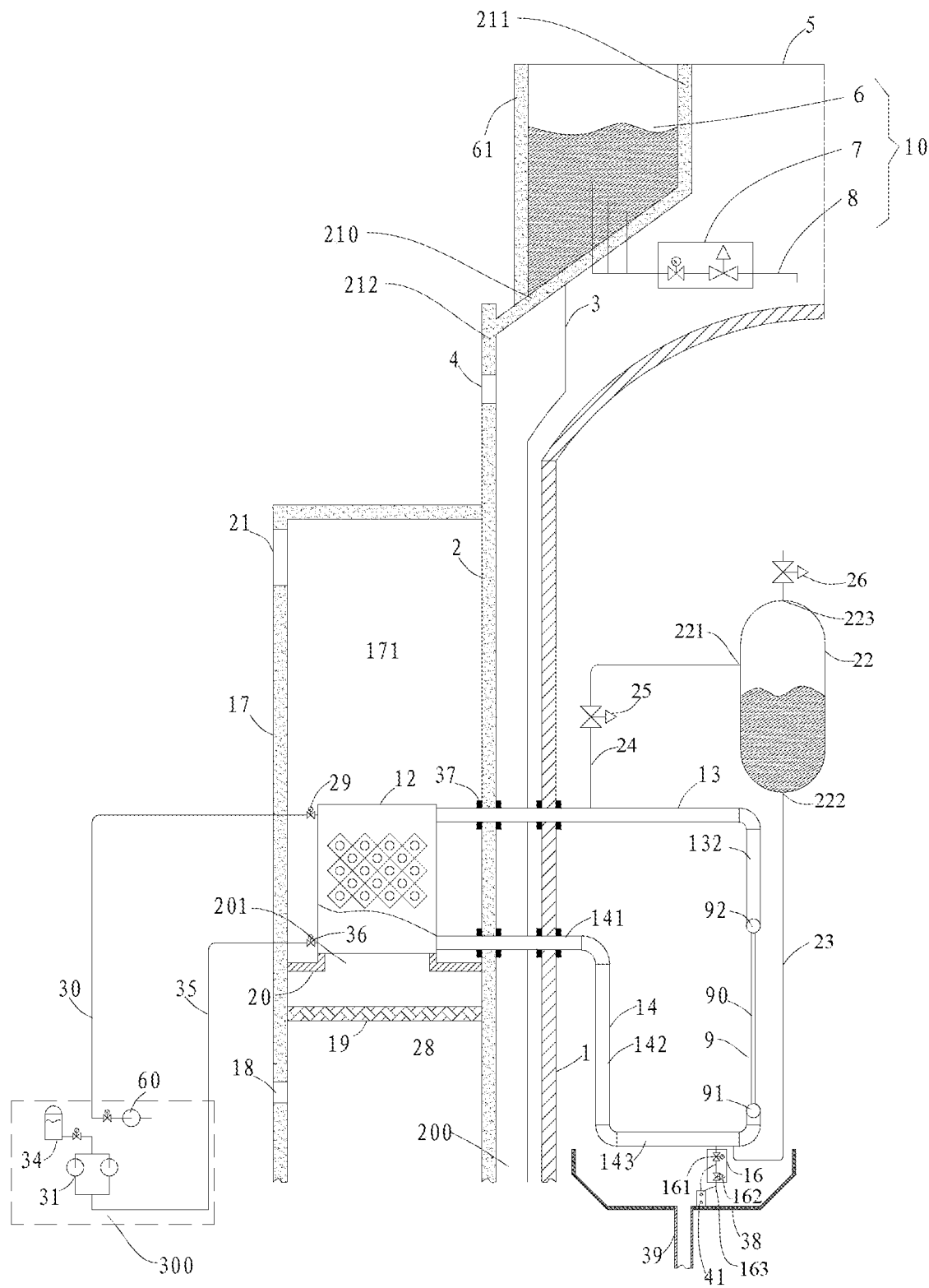
FIG. 6 is a partial view schematically showing a passive containment heat removal system according to one embodiment of the present invention.

The passive containment heat removal system according to further embodiments of the present invention is shown in FIG. 6. As shown in FIG. 6, the auxiliary circulation system 300 for the heat-carrying agent comprises the heat-carrying agent tank 34 connected with the external air cooler 12 via the circulation pump, the first heat-carrying agent pipe 35 and the first valve 36, the circulation pump 31, and the vacuum pump 60 is connected with the external air cooler 12 via the second heat-carrying agent pipe 30 and the second valve 29. Furthermore, in the embodiment shown in FIG. 6, no valve is disposed in the first communication pipe 13 and the second communication pipe 14. It is particularly beneficial, e.g. when the heat-carrying agent is Freon. The other constructions of the passive containment heat removal system shown in FIG. 6 are similar to the embodiment shown in FIG. 3. No detail descriptions will be made herein.

Figure 7:
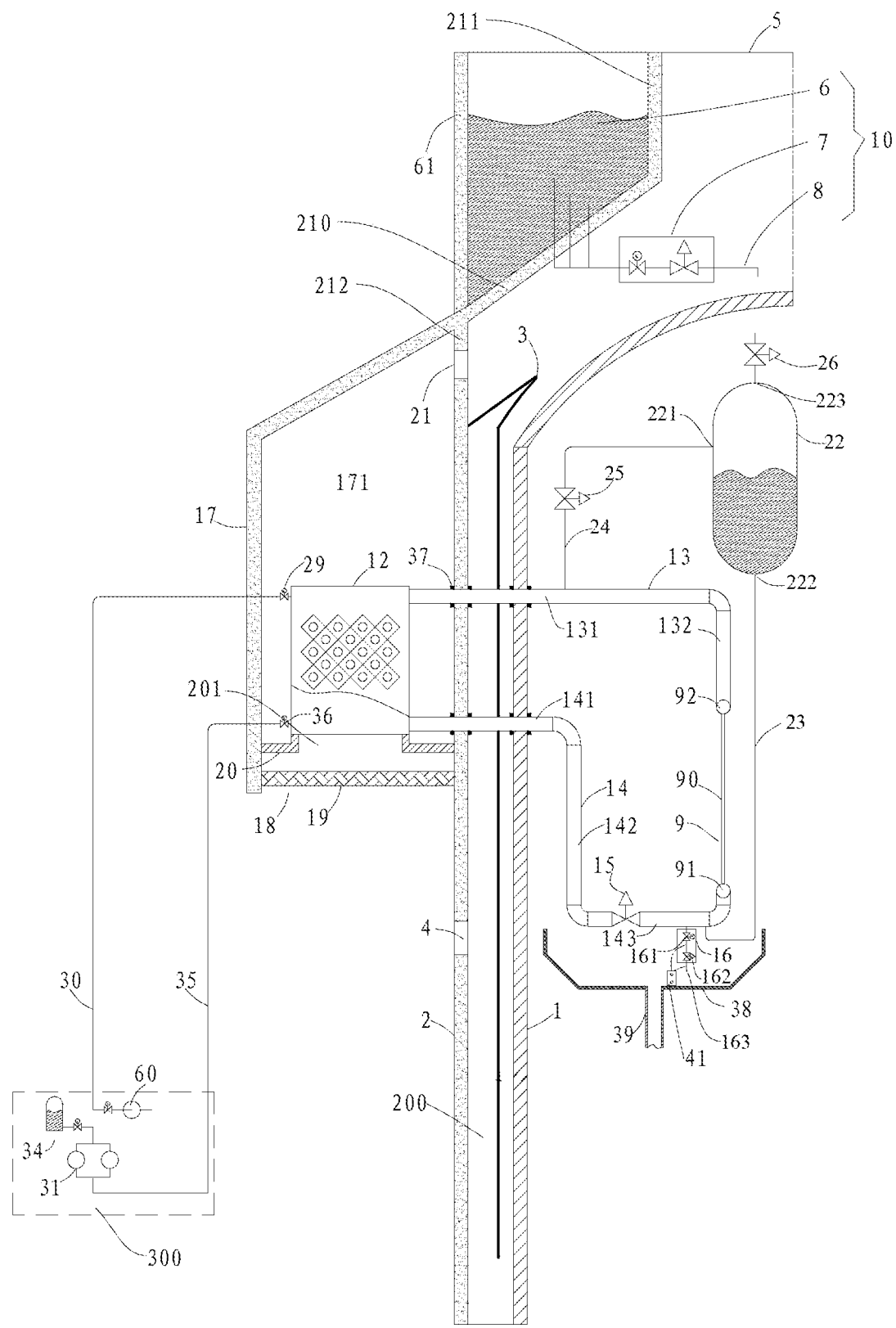
FIG. 7 is a partial view schematically showing a passive containment heat removal system according to one embodiment of the present invention.

The passive containment heat removal system according to further embodiments of the present invention is shown in FIG. 7. As shown in FIG. 7, the auxiliary circulation system 300 for the heat-carrying agent comprises the heat-carrying agent tank 34 connected with the external air cooler 12 via the circulation pump, the first heat-carrying agent pipe 35 and the first valve 36, the circulation pump 31, and the vacuum pump 60 is connected with the external air cooler 12 via the second heat-carrying agent pipe 30 and the second valve 29. Furthermore, in the embodiment shown in FIG. 7, no valve is disposed in the first communication pipe 13 and the second communication pipe 14. It is particularly beneficial, e.g. when the heat-carrying agent is Freon. The other construction of the passive containment heat removal system shown in FIG. 7 is similar to the embodiment shown in FIG. 4. No detail descriptions will be made herein.

The embodiments shown in FIG. 5-7 are particularly applied, when the heat-carrying agent is Freon. Since an ice point of Freon is very low, the circulation loop of heat-carrying agent is under a vacuum by the vacuum pump 60. Freon can automatically enter into the circulation loop of heat-carrying agent when an accident happens in the nuclear power plant.

Figure 8:
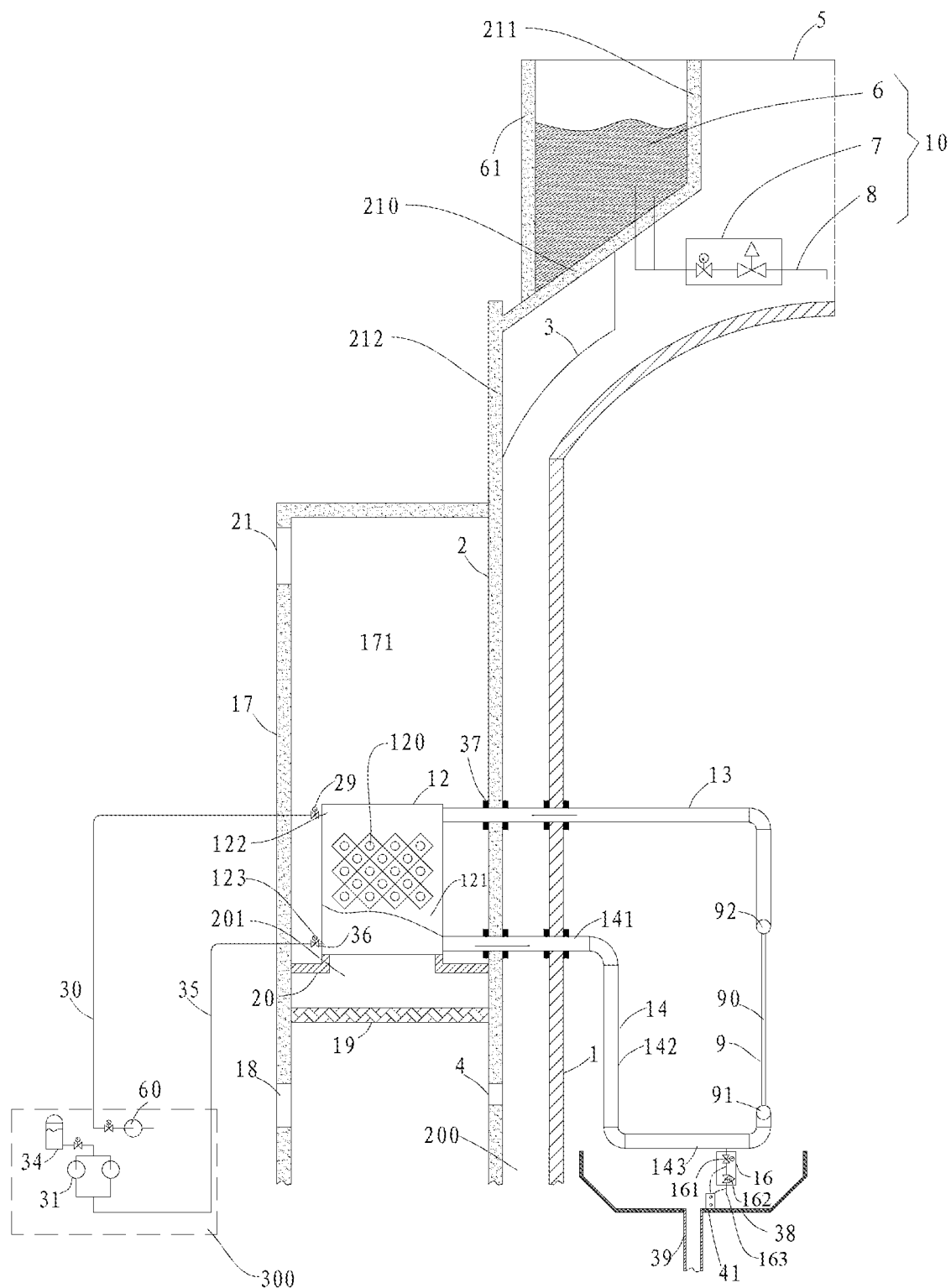
FIG. 8 is a vertical schematic view schematically showing a passive containment heat removal system according to one embodiment of the present invention.
Figure 9:
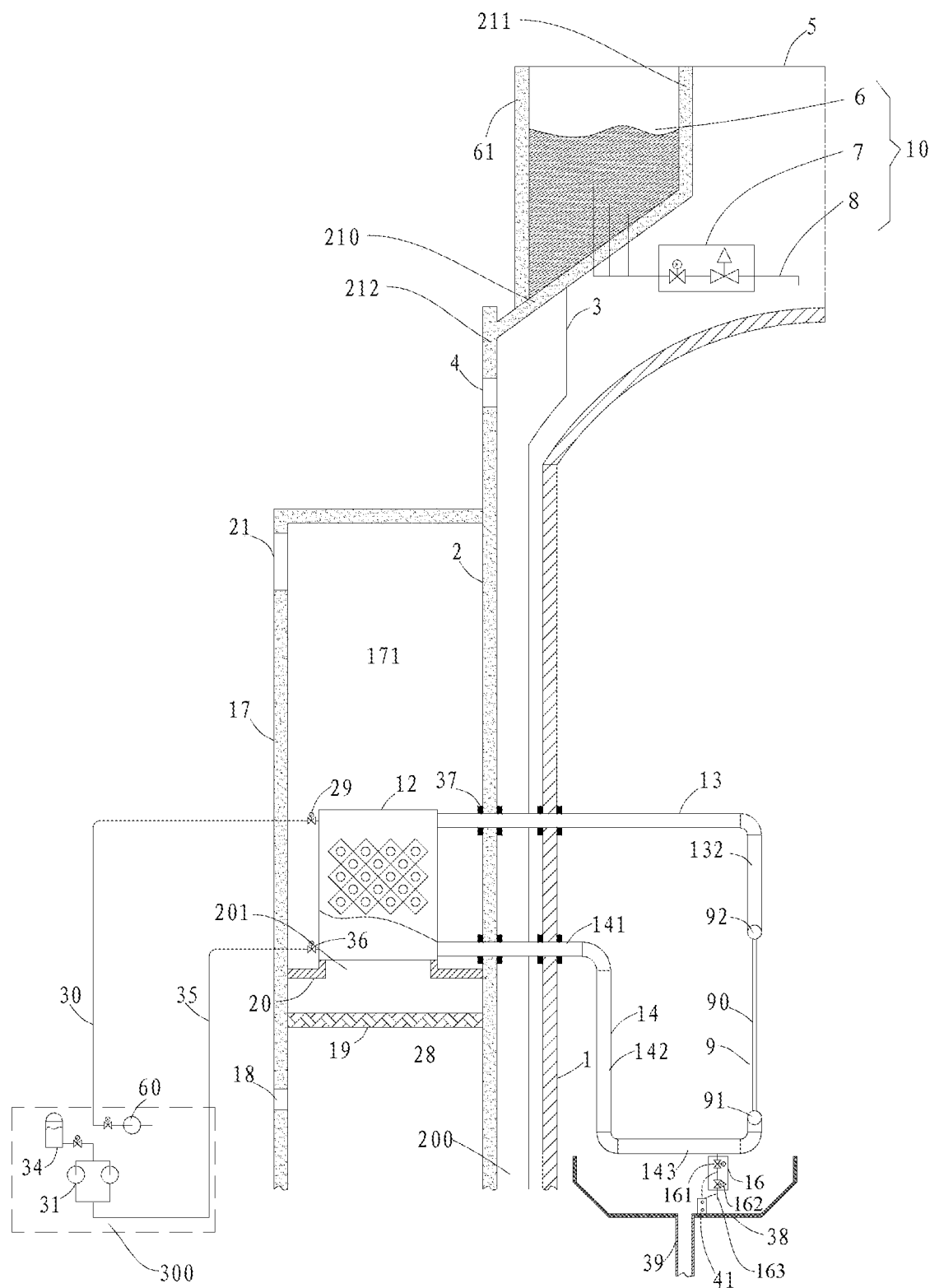
FIG. 9 is a partial view schematically showing a passive containment heat removal system according to one embodiment of the present invention.
Figure 10:
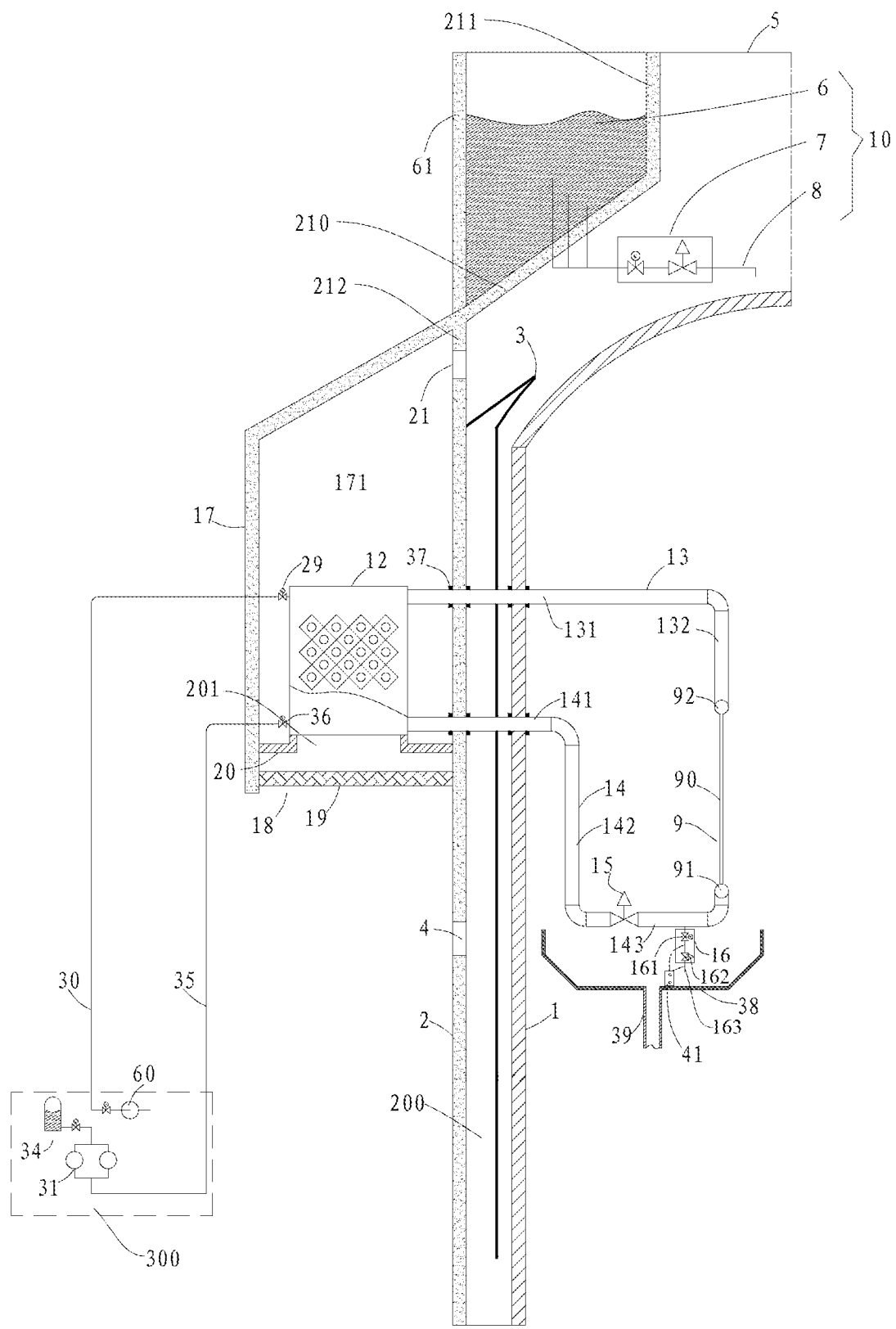
FIG. 10 is a partial view schematically showing a passive containment heat removal system according to one embodiment of the present invention.

The other constructions of the embodiment shown in FIG. 8 are similar to the embodiment shown in FIG. 5 except that the expansion tank 22 is omitted. No detail descriptions will be made herein. The other constructions of the embodiment shown in FIG. 9 are similar to the embodiment shown in FIG. 6 except that the expansion tank 22 is omitted. No detail descriptions will be made herein. The other constructions of the embodiment shown in FIG. 10 are similar to the embodiment shown in FIG. 7 except that the expansion tank 22 is omitted. No detail descriptions will be made herein. The embodiments shown in FIG. 8-9 are particularly applied, when heat-carrying agent is Freon.

Figure 11:
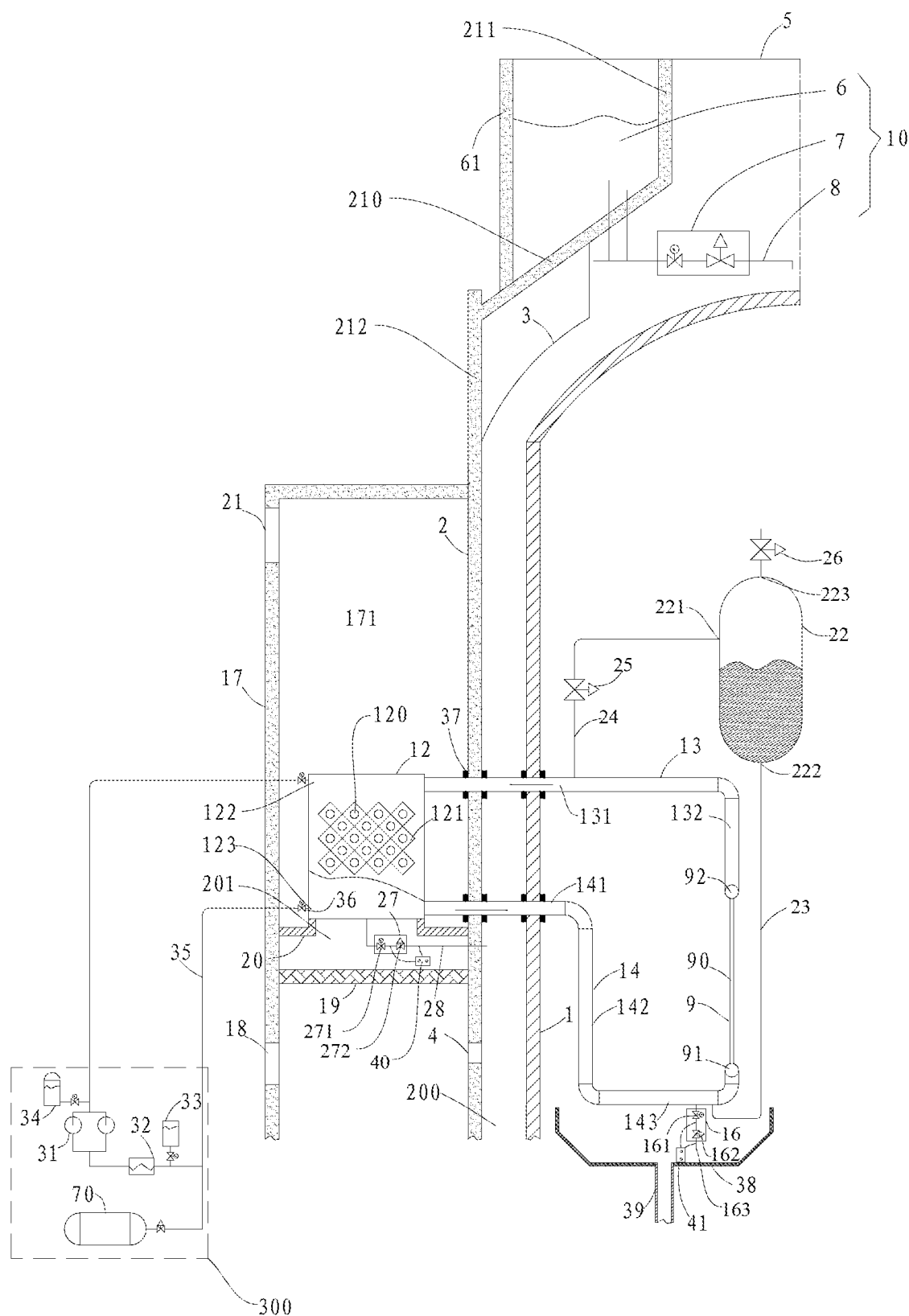
FIG. 11 is a vertical view schematically showing a passive containment heat removal system according to one embodiment of the present invention.

The passive containment heat removal system according to further embodiments of the present invention is shown in FIG. 11. As shown in FIG. 11, the auxiliary circulation system 300 for the heat-carrying agent further comprises a pressure-containing heat-carrying agent tank 70 which is connected with the first heat-carrying agent pipe 35, wherein the valve at the first communication pipe 13 and the second communication pipe 14 is omitted. The other constructions of the embodiment shown in FIG. 11 are similar to the embodiment shown in FIG. 1. No detail descriptions will be made herein.

Figure 12:
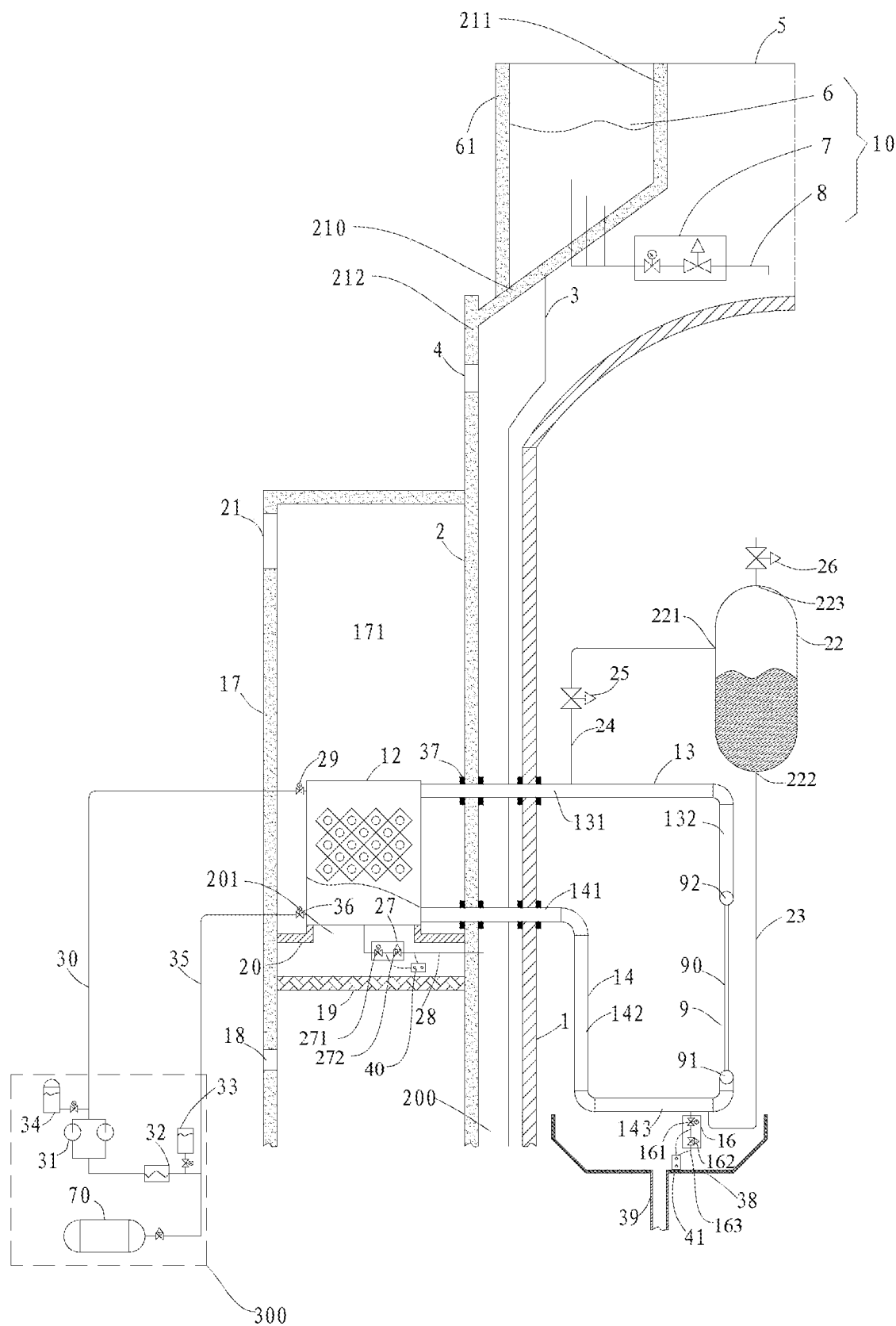
FIG. 12 is a partial view schematically showing a passive containment heat removal system according to one embodiment of the present invention.

The passive containment heat removal system according to further embodiments of the present invention is shown in FIG. 12. As shown in FIG. 12, the auxiliary circulation system 300 for the heat-carrying agent further comprises a pressure-containing heat-carrying agent tank 70 which is connected with the first heat-carrying agent pipe 35, wherein the valve in the first communication pipe 13 and the second communication pipe 14 is omitted. The other constructions of the embodiment shown in FIG. 12 are similar to the embodiment shown in FIG. 3. No detail descriptions will be made herein.

Figure 13:
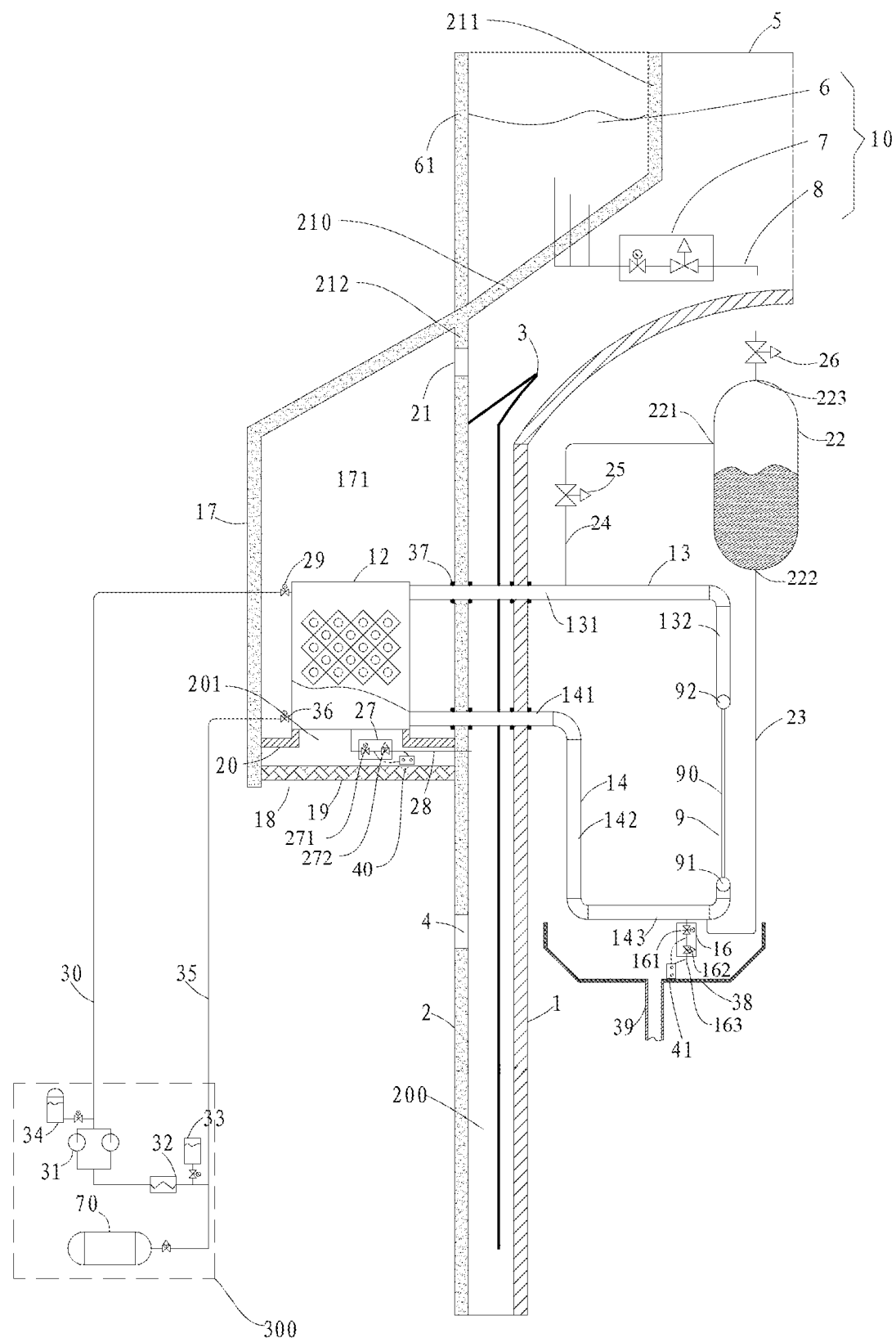
FIG. 13 is a partial view schematically showing a passive containment heat removal system according to one embodiment of the present invention.

The passive containment heat removal system according to further embodiments of the present invention is shown in FIG. 13. As shown in FIG. 13, the auxiliary circulation system 300 for the heat-carrying agent further comprises a pressure-containing heat-carrying agent tank 70 connected with the first heat-carrying agent pipe 35, wherein the valve in the first communication pipe 13 and the second communication pipe 14 is omitted. The other constructions of the embodiment shown in FIG. 13 are similar to the embodiment shown in FIG. 4. No detail descriptions will be made herein.

The embodiments shown in FIG. 11-13 are particularly applied, when heat-carrying agent is water, glycol or the mixture thereof.

Figure 14:
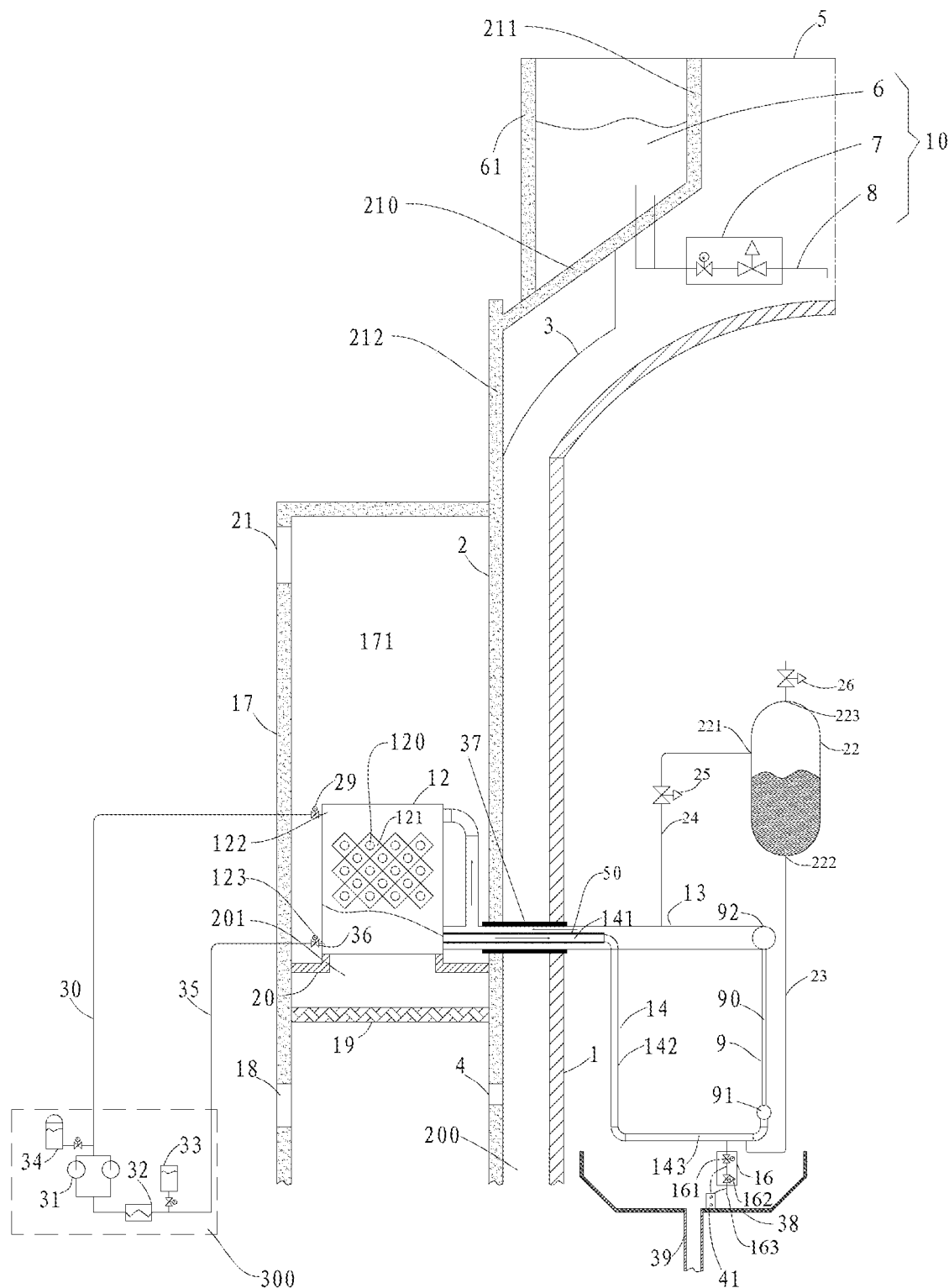
FIG. 14 is a vertical view schematically showing a passive containment heat removal system according to one embodiment of the present invention.

Further embodiments are shown in FIG. 14. As shown in FIG. 14, a first penetrating piece 37 is disposed in the wall of the inner containment 1 and a second penetrating piece 37 is disposed in the wall of the outer containment 2. The two penetrating pieces are formed integrally, i.e. are the same penetrating piece. The first communication pipe 13 and the second communication pipe 14 pass through the wall of inner containment 1 via a first penetrating piece 37, and the first communication pipe 13 and the second communication pipe 14 pass through the wall of the outer containment 2 via the second penetrating piece 37. As shown in FIG. 14, more preferably, the penetrating piece 37 in the wall of the inner containment 1 is the same penetrating piece with the penetrating piece 37 in the wall of the outer containment 2.

Therefore, the number of through-holes disposed on the inner containment and the outer containment is reduced to improve strength of the inner containment and the outer containment, thereby facilitating manufacture and sealing.

In the embodiment shown in FIG. 14, the first communication pipe 13 is arranged horizontally and the second communication pipe 14 comprises a second horizontal pipe segment 141, a third horizontal pipe segment 143 and a second vertical pipe segment 142 connecting the second horizontal pipe segment 141 and the third horizontal pipe segment 143 which are connected with each other in sequence. The second horizontal pipe segment 141 is connected with the outlet of the external air cooler 12. The third horizontal pipe segment 143 is connected with the inlet header 91. The second horizontal pipe segment 141 is sheathed with the first communication pipe 13.

Alternatively, the first communication pipe 13 can also comprise a first horizontal pipe segment 131 connected with the built-in heat exchanger 9 and a first vertical pipe segment 132 connected with the external air cooler (referred to FIG. 1). In the embodiment, the first horizontal pipe segment 131 is sheathed with the second horizontal pipe segment 141.

In the embodiment shown in FIG. 14, the second horizontal pipe segment 141 is sheathed with the first communication pipe 13 (or the first horizontal pipe segment 131). It can be understood that the present invent is not limited to this, for example the first communication pipe 13 can also be sheathed with the second horizontal pipe segment 141.

Preferably, a heat insulation layer 50 is disposed on a connecting pipe inside the second horizontal pipe segment and the first horizontal pipe segment to avoid the heat exchange between the heat-carrying agent in the first communication pipe 13 and the heat-carrying agent in the second communication pipe 14.

Alternatively, the first communication pipe 13 can also be not sheathed with the second communication pipe 14, but the first communication pipe 13 can be arranged in parallel with the second communication pipe 14 in the penetrating piece 37. In the embodiment, the heat insulation layer 50 can be disposed on at least one of the first communication pipe 13 and the second communication pipe 14.

The other constructions of the embodiment shown in FIG. 14 are similar to the embodiment shown in FIG. 1 except that no pressure-containing heat-carrying agent tank 70 is disposed in the auxiliary circulation system 300 for the heat-carrying agent. No detail descriptions will be made herein.

Figure 15:
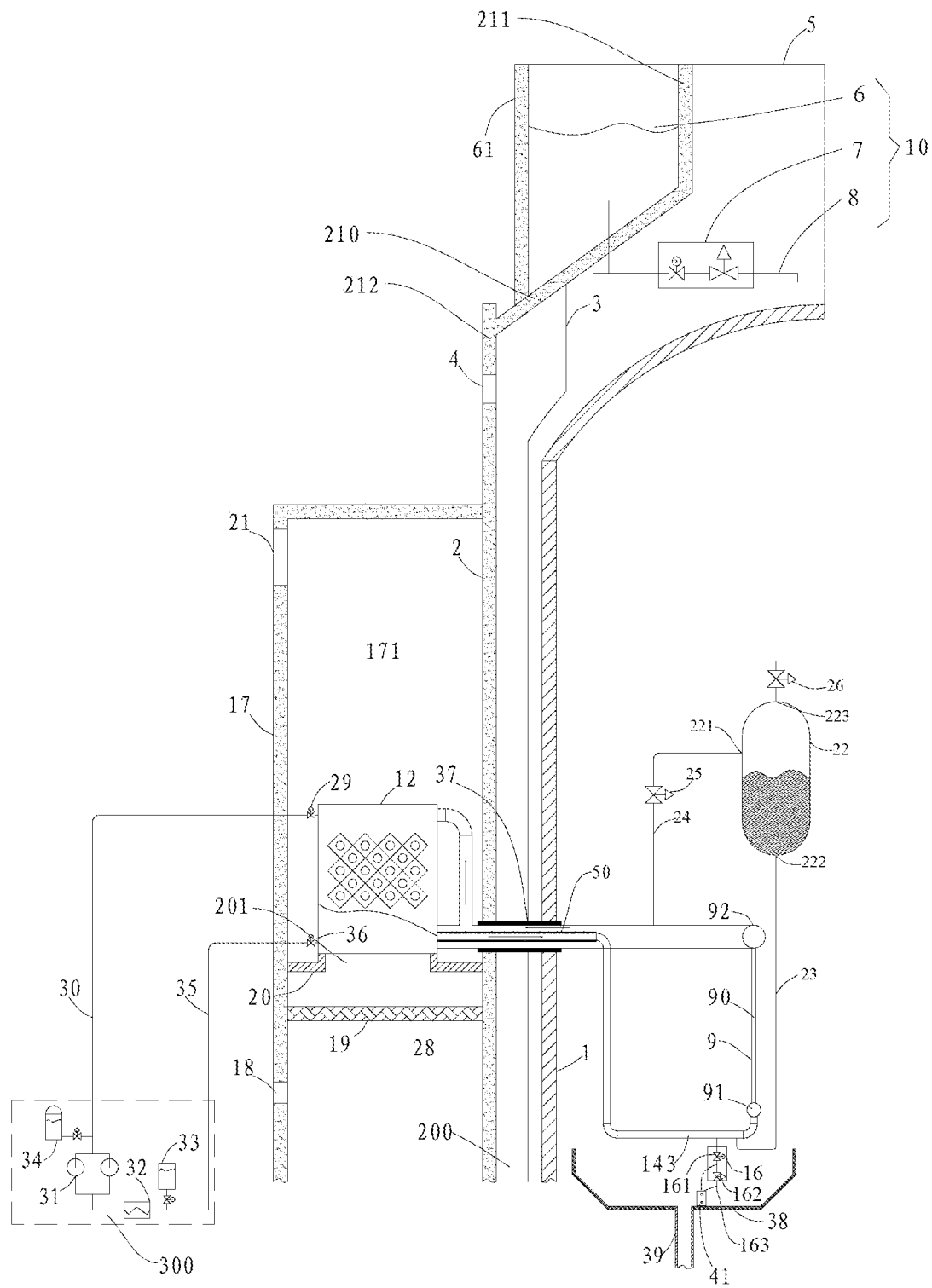
FIG. 15 is a partial view schematically showing a passive containment heat removal system according to one embodiment of the present invention.

Further embodiments of the present invention are shown in FIG. 15. As shows in FIG. 15, the air inlet 4 is above the upper part of the air cooling channel 171. The air deflector 3 extends from the upper part to the lower part of the air duct 200 and is contacted with the inner top of the outer containment 2. The other constructions of the embodiment shown in FIG. 15 are similar to the embodiment shown in FIG. 14. No detail descriptions will be made herein.

Figure 16:
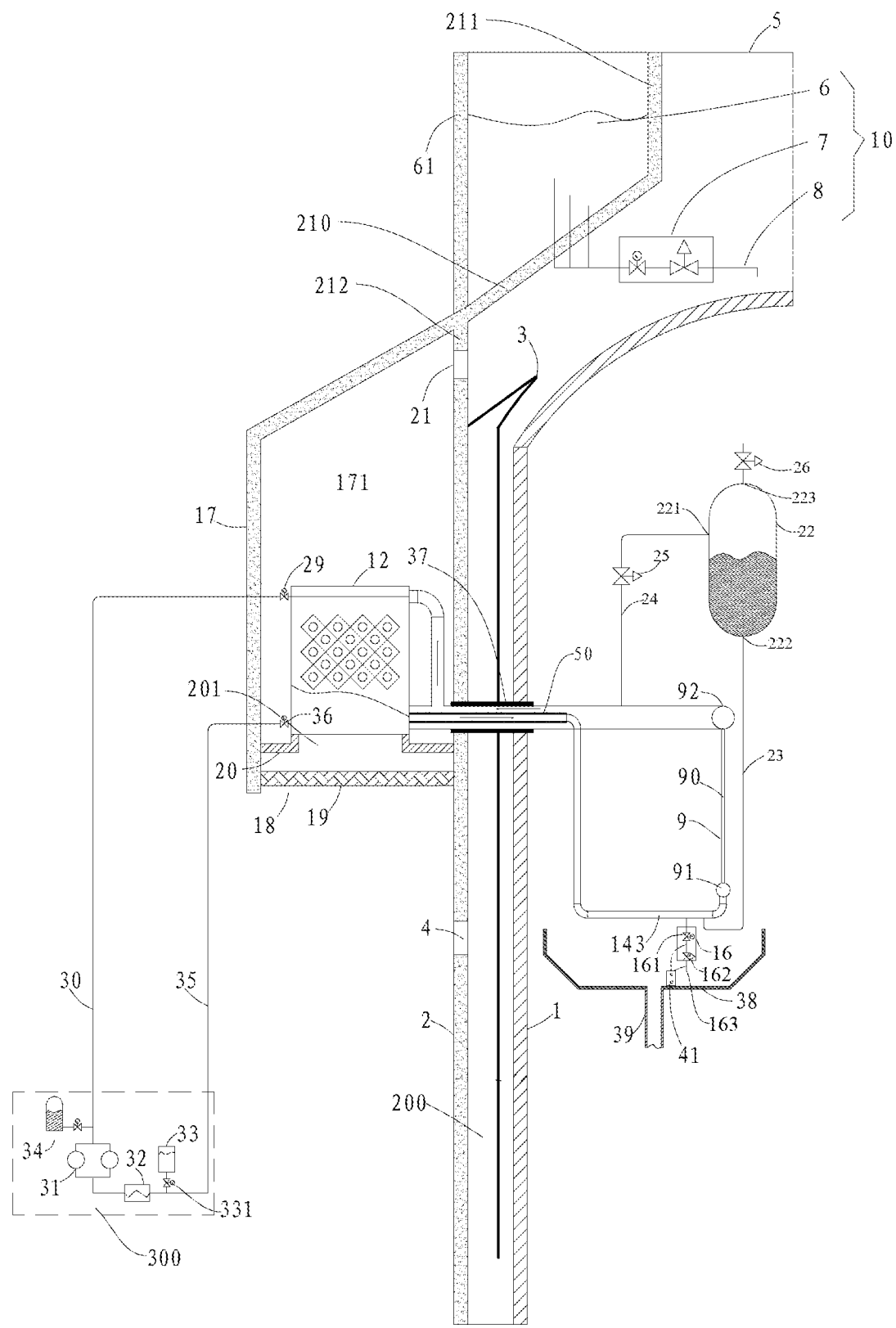
FIG. 16 is a partial view schematically showing a passive containment heat removal system according to one embodiment of the present invention.

Further embodiments of the present invention are shown in FIG. 16. As shows in FIG. 16, the air inlet 4 is below the lower part of the air cooling channel 171. The air deflector 3 extends from the upper part to the lower part of the air duct 200 and separates from the inner top of the outer containment 2. The air outlet 21 of the air cooling channel is formed on the top of the side wall of the outer containment 2. The other constructions of the embodiment shown in FIG. 16 are similar to the embodiment shown in FIG. 14. No detail descriptions will be made herein.

Figure 17:
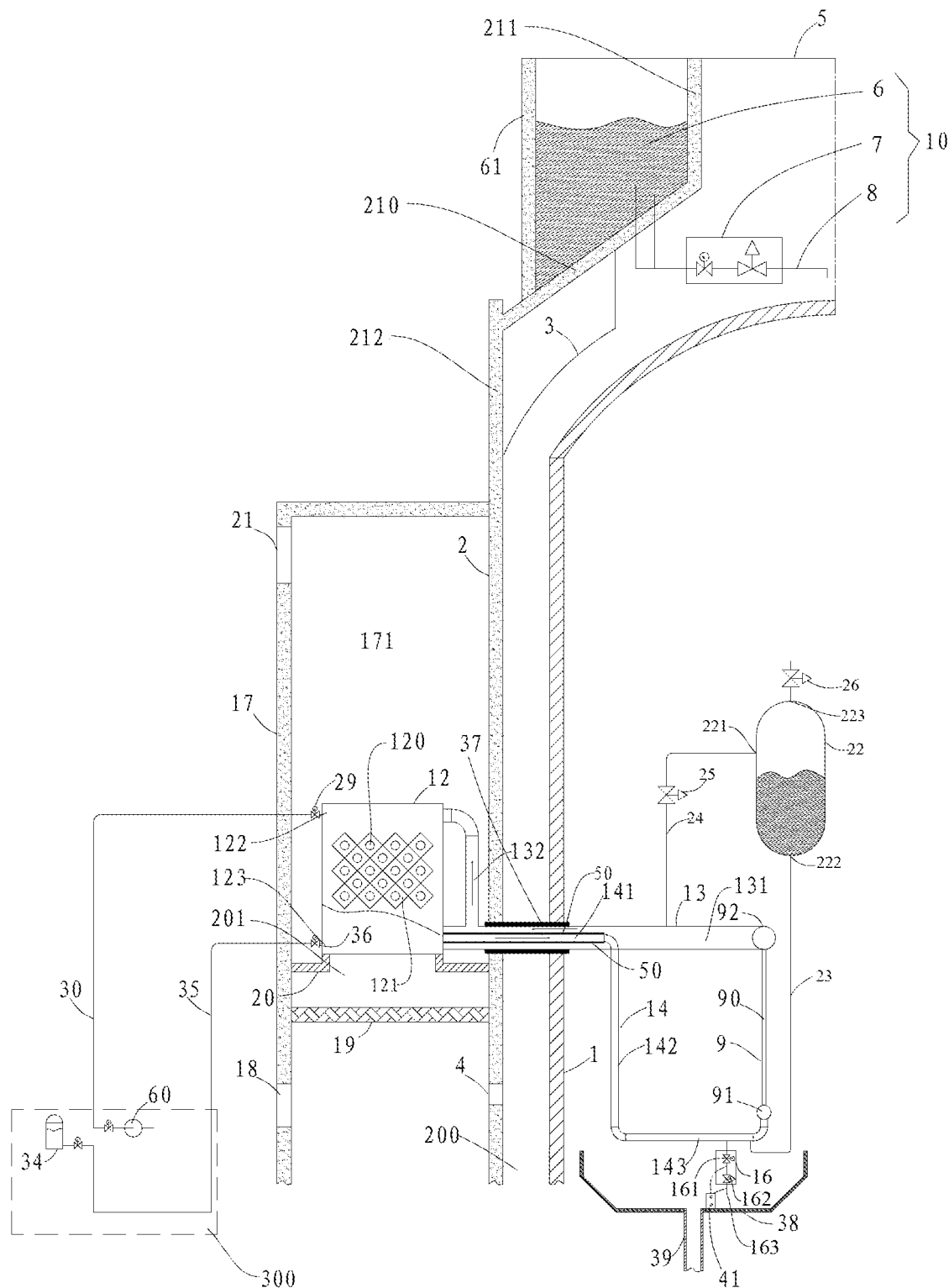
FIG. 17 is a vertical view schematically showing a passive containment heat removal system according to one embodiment of the present invention.

Further embodiments of the present invention are shown in FIG. 17. The other constructions of the embodiment shown in FIG. 17 are similar to the embodiment shown in FIG. 14 except that the auxiliary circulation system 300 for the heat-carrying agent of the embodiment shown in FIG. 17 comprises the heat-carrying agent tank 34 connected with the external air cooler 12 via the first heat-carrying agent pipe 35 and the first valve 36, and the vacuum pump 60 is connected with the external air cooler 12 via the second heat-carrying agent pipe 30 and the second valve 29.

Figure 18:
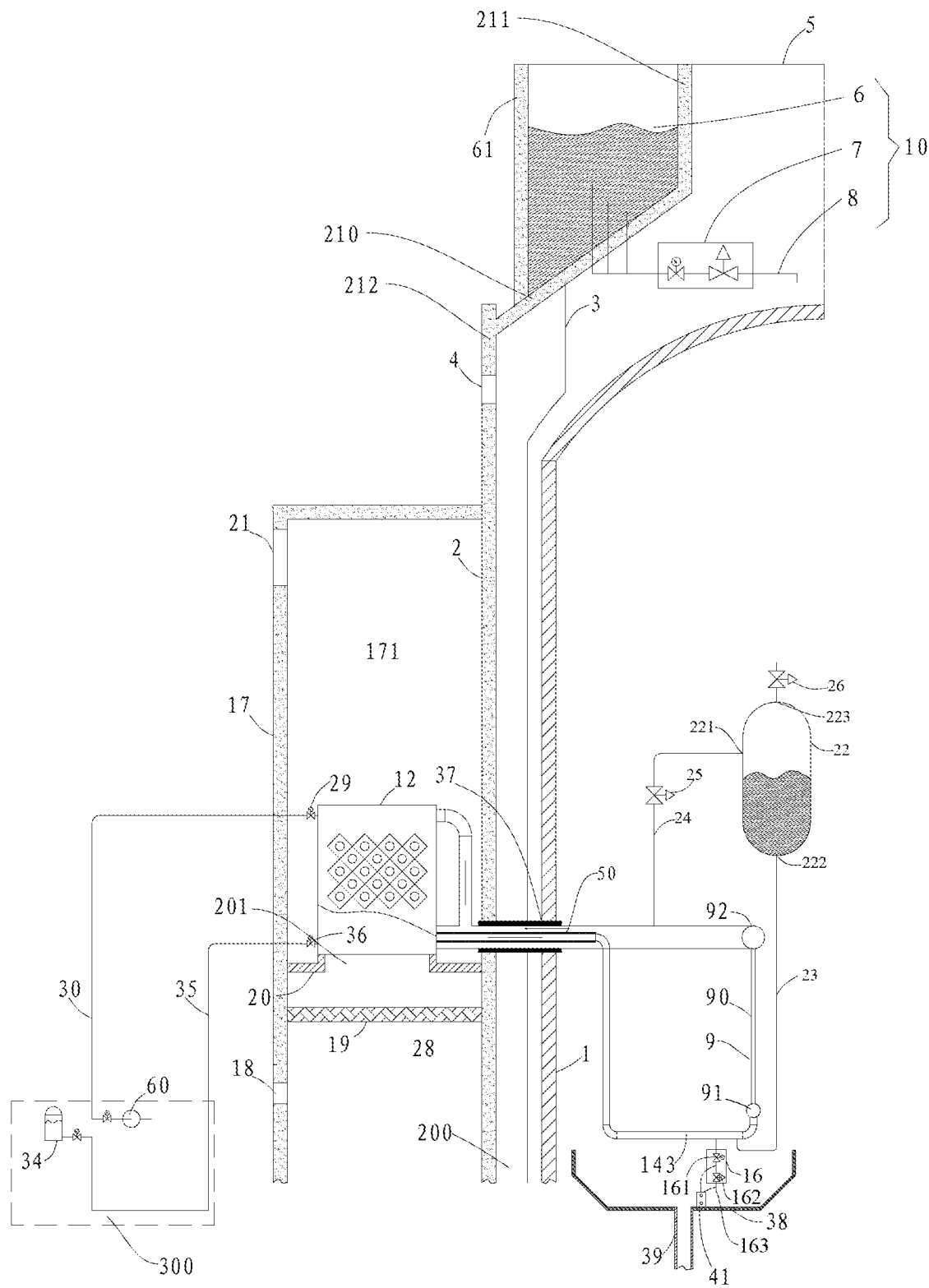
FIG. 18 is a partial view schematically showing a passive containment heat removal system according to one embodiment of the present invention.

Further embodiments of the present invention are shown in FIG. 18. The other constructions of the embodiment shown in FIG. 18 are similar to the embodiment shown in FIG. 15 except that the auxiliary circulation system 300 for the heat-carrying agent of the embodiment shown in FIG. 18 is similar to that in the embodiment shown in FIG. 17.

Figure 19:
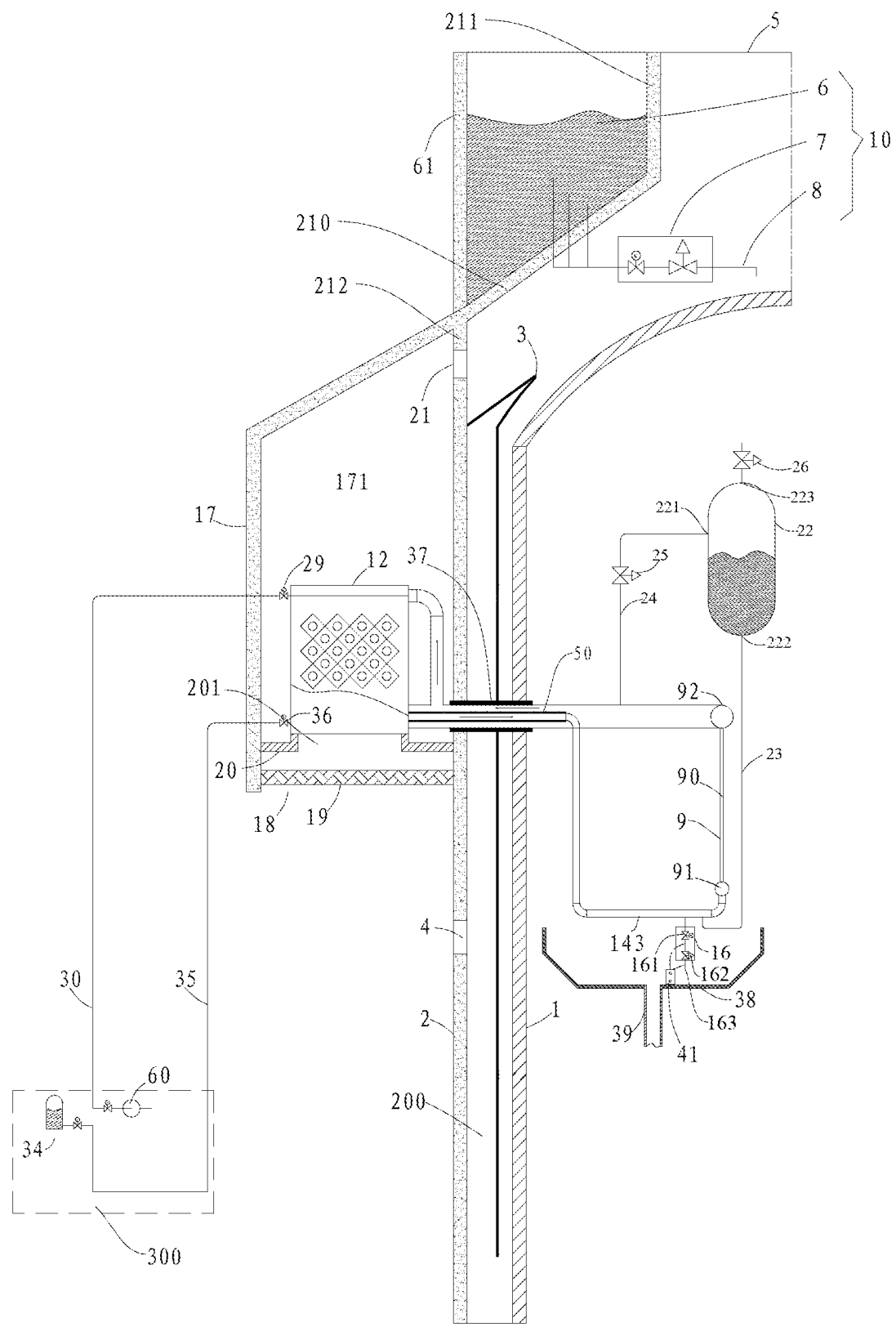
FIG. 19 is a partial view schematically showing a passive containment heat removal system according to one embodiment of the present invention.

Further embodiments of the present invention are shown in FIG. 19. The embodiment shown in FIG. 19 is similar to the embodiment shown in FIG. 16 except that the auxiliary circulation system 300 for the heat-carrying agent of the embodiment shown in FIG. 19 is similar to that in the embodiment shown in FIG. 17.

Figure 20:
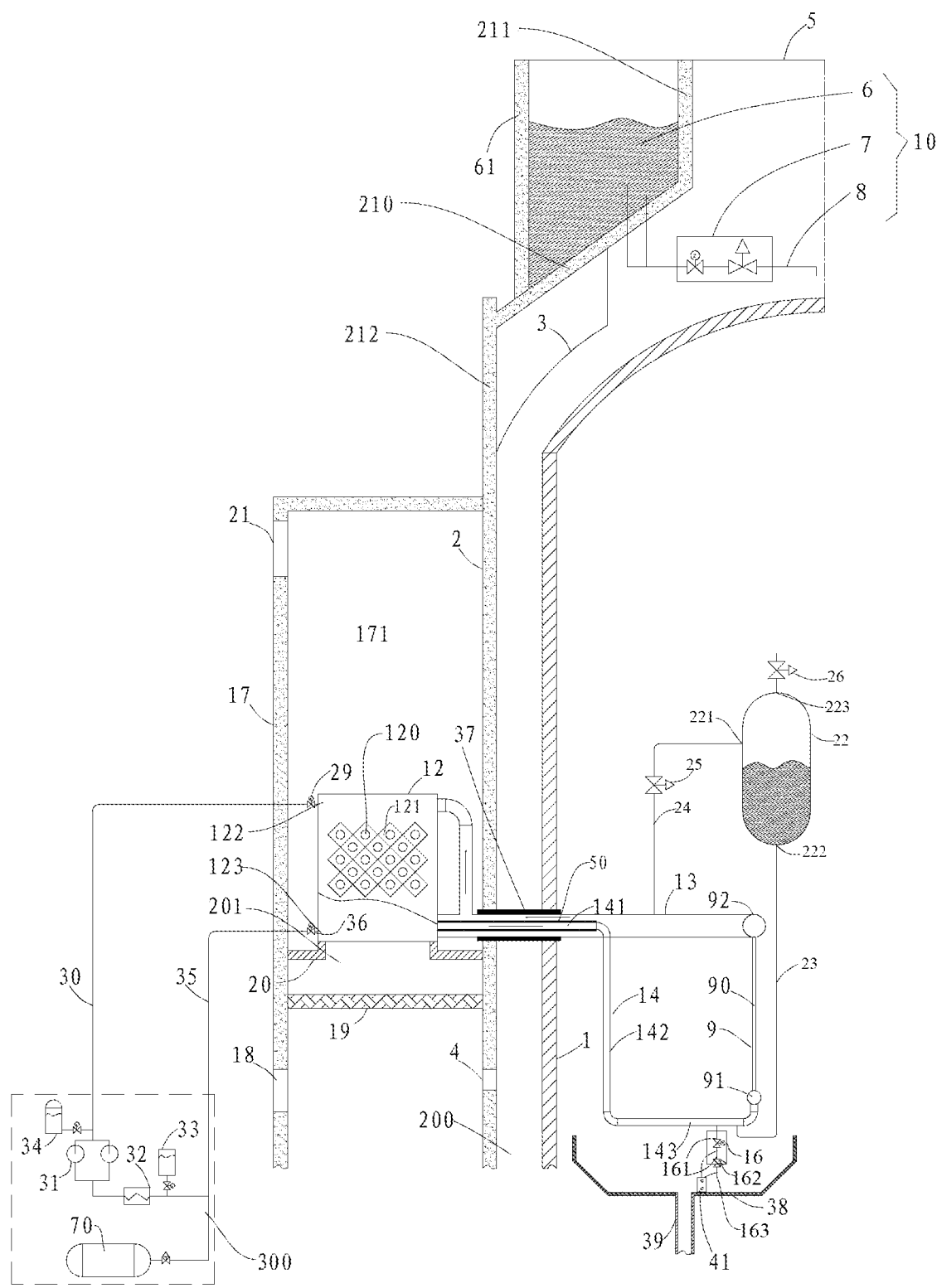
FIG. 20 is a vertical view schematically showing a passive containment heat removal system according to one embodiment of the present invention.

Further embodiments of the present invention are shown in FIG. 20. The embodiment shown in FIG. 20 is similar to the embodiment shown in FIG. 14 except that the auxiliary circulation system 300 for the heat-carrying agent of the embodiment shown in FIG. 20 is similar to that in the embodiment shown in FIG. 11.

Figure 21:
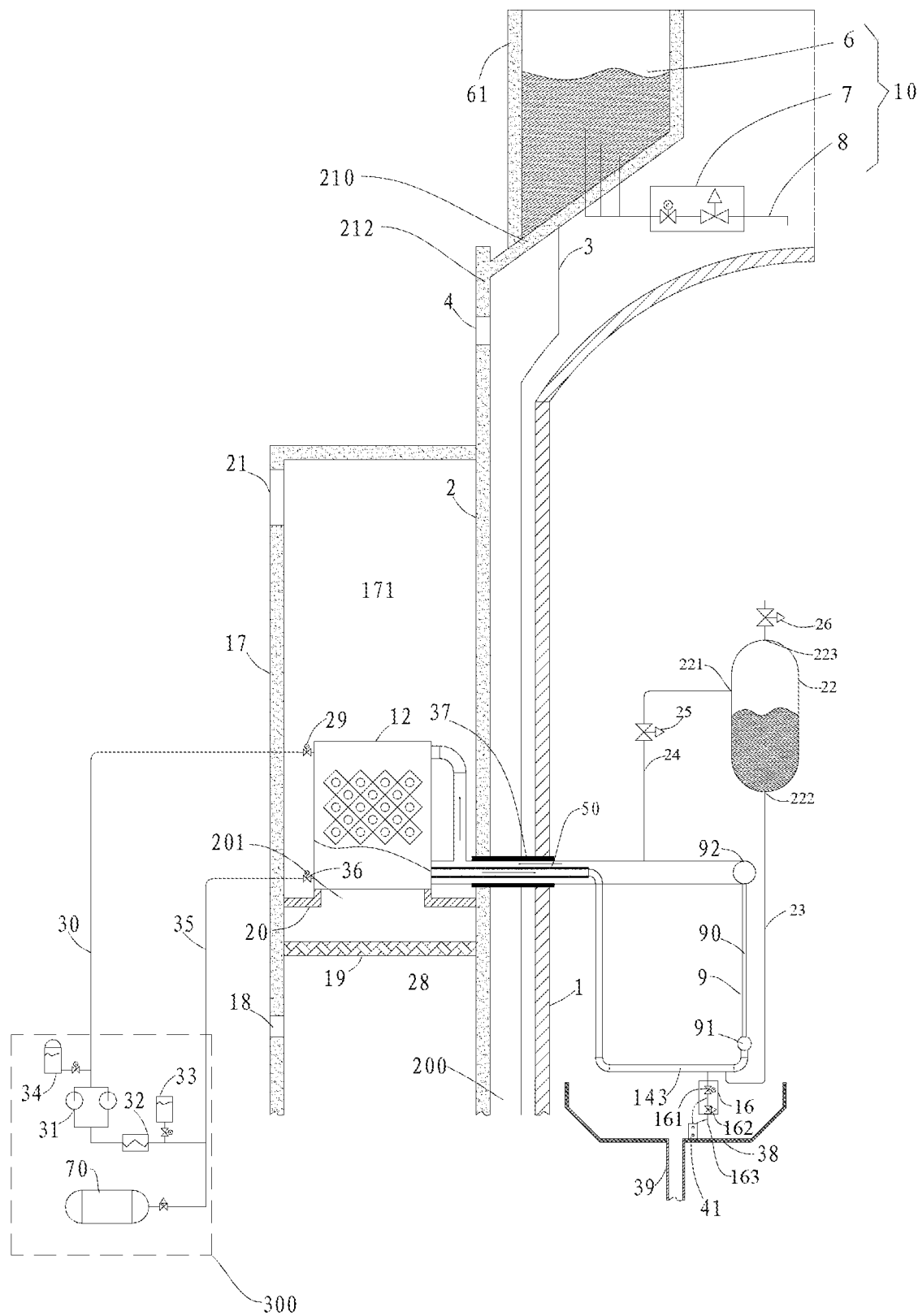
FIG. 21 is a partial view schematically showing a passive containment heat removal system according to one embodiment of the present invention.

Further embodiments of the present invention are shown in FIG. 21. The embodiment shown in FIG. 21 is similar to the embodiment shown in FIG. 15 except that the auxiliary circulation system 300 for the heat-carrying agent of the embodiment shown in FIG. 21 is similar to that in the embodiment shown in FIG. 12.

Figure 22:
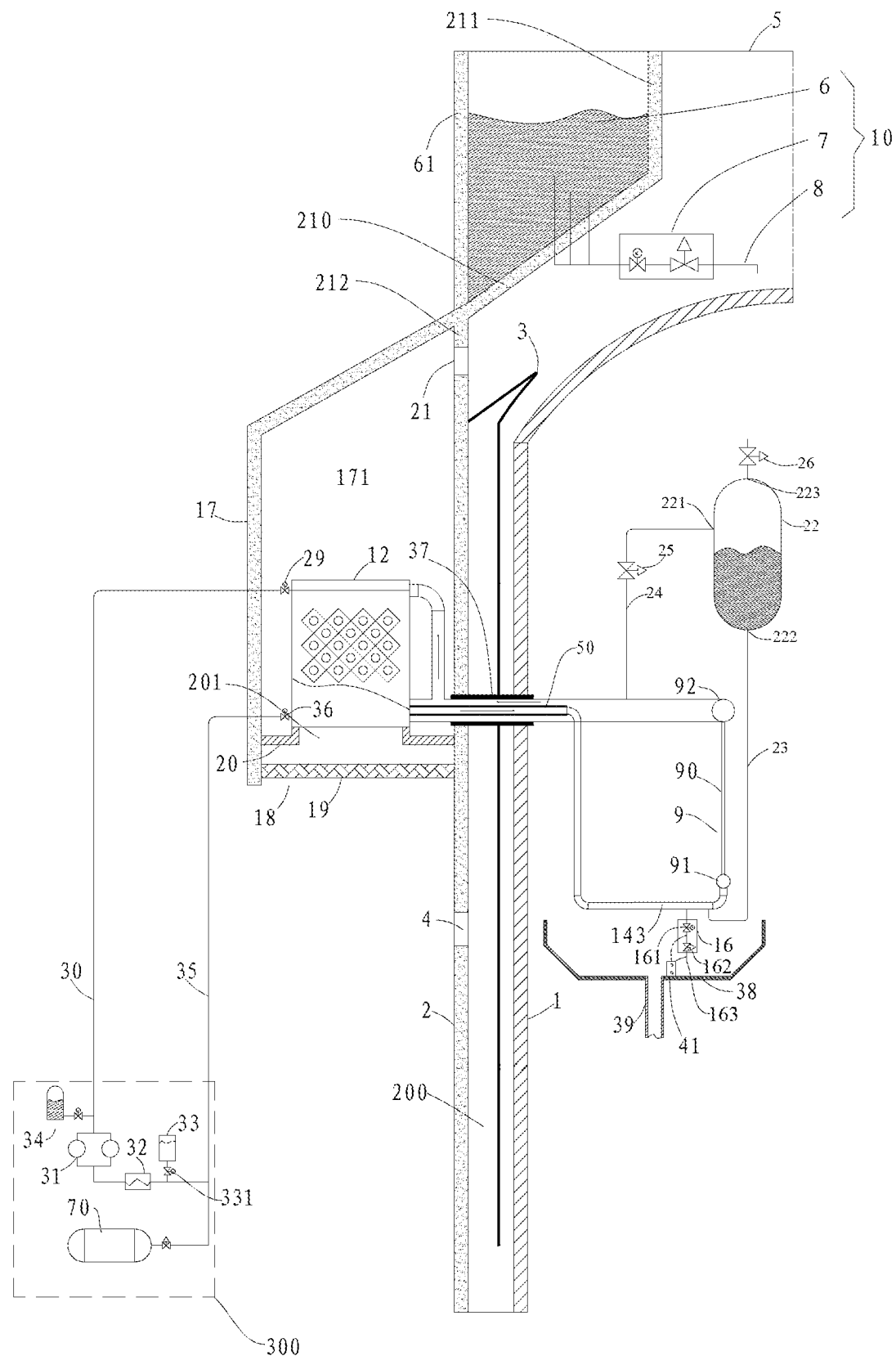
FIG. 22 is a partial view schematically showing a passive containment heat removal system according to one embodiment of the present invention.

Further embodiments of the present invention are shown in FIG. 22. The embodiment shown in FIG. 22 is similar to the embodiment shown in FIG. 16 except that the auxiliary circulation system 300 for the heat-carrying agent of the embodiment shown in FIG. 22 is similar to that in the embodiment shown in FIG. 13.

The passive containment heat removal system according to another embodiment of the present invention is described as follows. The passive containment heat removal system comprises a spraying passive cooling system and a cooling system for natural circulation of heat-carrying agent. The spraying passive cooling system comprises a spray assembly, an outer containment, an inner containment disposed inside the outer containment and an air duct formed between the inner containment and outer containment having an air duct inlet and an air duct outlet, wherein the spraying passive cooling system is used for cooling the inner containment by spraying cooling water to the outer wall of the inner containment and by air flow in the air duct. The cooling system for natural circulation of heat-carrying agent is used to remove the heat from the inner containment by the heat-carrying agent circulated naturally between the inner containment and the outer containment to cool the inner containment, and is used to cool the heat-carrying agent by the air cooling duct outside the outer containment.

In one specific embodiment, the cooling system for natural circulation of heat-carrying agent comprises the built-in heat exchanger disposed in the inner containment, the air cooling channel located outside the outer containment, and the external air cooler disposed in the air cooling channel, wherein the built-in heat exchanger is connected with the heat exchanger via the first communication pipe and the second communication pipe.

In one specific embodiment, the spraying assembly 10 comprises the water tank 6 disposed outside the outer containment 2, the spraying pipe 8 with a first end connected with the water tank 6 and a second end located on the top of the inner containment 1, and the spraying valve 7 disposed on the spraying pipe 8.

Preferably, the water tank 6 is integrally formed with the outer containment 2. The spraying valve comprises an electric valve and a pneumatic valve which are connected with each other in series.

In some embodiments, when an accident happens, the spraying passive cooling system sprays cooling water to the outer wall of the inner containment and the cooling system for natural circulation of heat-carrying agent cools the inner containment by the heat-carrying agent naturally circulated between the outer containment and the inner containment, so that the amount of spraying water of the passive containment heat removal system is reduced per unit time and a spraying time is extended, and after the cooling water of the passive containment heat removal system is exhausted, the inner containment is cooled by the air flow in the air duct and the heat-carrying agent naturally circulated.

Alternatively, when an accident happens, the spraying passive cooling system sprays the cooling water to the outer wall of the inner containment to cool the inner containment and at the same time the heat-carrying agent is circulated naturally between the outer containment and the inner containment; and after the cooling water of the spraying passive cooling system is exhausted, the inner containment is cooled by the air flow in the air duct and the heat-carrying agent naturally circulated between the outer containment and the inner containment.

Alternatively, when an accident happens, the spraying passive cooling system sprays cooling water to the outer wall of the inner containment to cool the inner containment; when the temperature and/or the pressure of the inner containment exceed the designated threshold value during the process of spraying cooling water the heat-carrying agent is circulated naturally between the outer containment and the inner containment; and after the cooling water of the spraying passive cooling system is exhausted, the inner containment is cooled by the air flow in the air duct and the heat-carrying agent naturally circulated between the outer containment and the inner containment.

Alternatively, when an accident happens, the spraying passive cooling system sprays the cooling water to the outer wall of the inner containment to cool the inner containment; and after the cooling water of the spraying passive cooling system is exhausted, the inner containment is cooled by the air flow in the air duct; and when the temperature and/or the pressure of the inner containment exceed the designated threshold value during the process of spraying cooling water as well as after the cooling water of the spraying assembly is exhausted, the heat-carrying agent is circulated naturally between the outer containment and the inner containment.

A method for controlling the passive containment heat removal system according to the embodiments of the present invention described above is described as follows. The method according to an embodiment of the present invention comprises, triggering automatically spraying of the cooling water to the outer wall of the inner containment to cool the inner containment by spraying and circulating naturally the heat-carrying agent between the inner containment and the outer containment to cool the inner containment when an accident happens.

In the method for controlling the passive containment heat removal system according to the embodiments of the present invention, the inner containment is cooled by the heat-carrying agent naturally circulated between the inner containment and the outer containment even after the cooling water is exhausted, for example within the first 20-30 days of the accident, thereby meeting the demand of the heat removal from the inner containment and improving the safety performance.

In some specific embodiments, the cooling water is sprayed on the outer wall of the inner containment while the heat-carrying agent is circulated naturally between the inner containment and the outer containment in order to reduce the amount of the spraying water per unit time and extend the spraying time, and after the cooling water is exhausted, the inner containment is cooled by the air flow in the air duct between the inner containment and the outer containment and by the heat-carrying agent circulated naturally between the inner containment and the outer containment.

Alternatively, the heat-carrying agent is not circulated naturally between the external air cooler and the built-in heat-exchanger during the process of spraying cooling water, and after the cooling water is exhausted, the inner containment is cooled by the air flow in the air duct between the inner containment and the outer containment and by the heat-carrying agent circulated naturally between the inner containment and the outer containment.

Alternatively, when the temperature and/or the pressure of the inner containment exceeds the designated threshold value during the process of spraying cooling water, the heat-carrying agent is circulated naturally between the inner containment and the outer containment; and after the cooling water is exhausted, the inner containment is cooled by the air flow in the air duct between the inner containment and the outer containment and by the heat-carrying agent circulated naturally between the inner containment and the outer containment.

Preferably, after the cooling water is exhausted, the inner containment is cooled by the air flow in the air duct between the inner containment and the outer containment; and when the temperature and/or the pressure of the inner containment exceeds the designated threshold value during the process of spraying cooling water as well as after the cooling water is exhausted, the heat-carrying agent is circulated naturally between the inner containment and the outer containment.

It is to be appreciated by those skilled in the art, when water is used as the heat-carrying agent of the cooling system for natural circulation of heat-carrying agent and the nuclear power plant locates in a cold region, the water in the cooling system for natural circulation of heat-carrying agent may be drained when no accident happens. When an accident happens, the spraying passive cooling system firstly run to spray the cooling water, water is supplemented to the cooling system for natural circulation of heat-carrying agent at the same time; and the inner containment is cooled by the natural circulation induced by the temperature difference and the pressure difference; and after the water is exhausted, the inner containment is cooled by the air flow in the air duct and the cooling system for natural circulation of heat-carrying agent.

The nuclear power plant locates in the place where there is on ice period, when an accident happens, the spraying passive cooling system firstly run to spray the cooling water and at the same time the inner containment is cooled by the cooling system for natural circulation of heat-carrying agent by the natural circulation induced by the temperature difference and the pressure difference. After the water is exhausted, the inner containment is further cooled by the air flow in the air duct.

In addition, when a non-aqueous organic heat-carrying agent is used as the heat-carrying agent in the cooling system for natural circulation of heat-carrying agent, the cooling system for natural circulation of heat-carrying agent does not have to be drained and no valve is required to be disposed in the duct for those in a cold region, thereby simplifying the construction and reducing the cost.

The pressurized water reactor according to an embodiment of the present invention comprises the passive containment heat removal system described above. Other constructions of the pressurized water reactor such as a reactor core are well known to those skilled in the art. No detail descriptions will be made herein.

There are two independent sets of passive containment heat removal system (PCS) according to the embodiments of the present invention described above. A first passive containment heat removal system (PCS1, can be also referred to spraying passive cooling system) comprises the inner containment 1, the outer containment 2, the air duct 200 and the spraying assembly 10 having a spraying heat removal mode and an air flow heat removal mode, and a second passive containment heat removal system (PCS2, can be also referred to cooling system for natural circulation of heat-carrying agent) comprises the air cooling channel 171, the built-in heat exchanger 9, the external air cooler 12, the first communication pipe 13 and the second communication pipe 14, i.e. is consist of a closed natural circulation system and an air cooling system, wherein the air cooling system is run in a dry mode.

PCS1 comprises a steel inner containment 1, a concrete outer containment 2, an air deflector 3, an air duct 200, an air inlet 4, n air outlet 5, a water tank 6, a spraying valve 7 and a spraying pipe 8. The decay heat of the reactor in the form of steam is released to the inner containment 1 and the steam condenses on the surface of the inner wall of the steel inner containment 1, the decay heat is transferred to the outer wall of the steel inner containment 1 by heat conduction. The cold air induced from the air inlet 4 to the air duct 200 flows upward via an annular passage between the inner wall of the concrete outer containment 2 and the inner containment 1, and performs a heat exchange with the outer wall of the inner containment 1. The heated air flows upward and is released via the air outlet 5 to the atmosphere.

PCS2 comprises the inner heat exchange pipe 90, the inlet header 91, the outlet header 92, the first vertical pipe segment (i.e. an upward pipe) 132, the first pneumatic valve 11, the second pneumatic valve 15, the external air cooler 12, the first communication pipe 13, the second communication pipe 14 and the air cooling channel 171. As described above, the built-in heat exchanger 9 is consist of the inner heat exchange pipe 90, the inlet header 91 and the outlet header 92, wherein the inner heat exchange pipe 90 is consist of a plurality of heat conduct pipes arranged in parallel. It can be understood that the inner heat exchange pipe 90 is not limited to a vertical arrangement shown in FIG. 1, but can be also aslant arranged. Meanwhile, a smooth pipe and an enhanced heat exchange pipe can be used as the inner heat exchange pipe. The inner heat exchange pipe 90 can be for example selected from stainless steel pipe, copper pipe or aluminum pipe and so forth.

During PCS2 is run, the first pneumatic valve 11, the second pneumatic valve 15 and the second venting valve 26 are open, the air in the inner containment 1 heats the inner heat exchange pipe 90 by means of condensation and natural convection, and the density of the water in the inner heat exchange pipe 90 is reduced due to the heat to form a density difference between the water of the external air cooler 12 and the second vertical pipe segment (i.e. the downward pipe) 14 and the water in the inner heat exchange pipe 90, so that the water natural circulation is drove by the difference. The water brings the heat out of the inner containment 1 and performs a heat exchange with the air in the external air cooler 12 and the air cooling channel 171, so that the heated air is exhausted from the second air outlet 21 to the atmosphere.

As described above, preferably, the air cooling channel 171 is formed from the concrete outer containment 2 and the external air cooler 12 is disposed inside the chimney wall 17. The cold air enters into the air cooling channel 171 via the air inlet 18 of the air cooling channel and impinges laterally the outer heat exchange pipe 120 with the fins 121. The heated air is released to the atmosphere via the air outlet 21 of the air cooling channel. Therefore, the run of PCS2 totally depends on variations of the parameter of the working medium (in present embodiment the working medium is water) and does not depend on support from the external power source, thereby achieving total passive.

It combines with an upward air flow and is exhausted to the atmosphere via the air outlet 5.

The chimney wall 17 has a resistant to the external impact to play a role in a physical protection for the external air cooler 12 by integrally forming the chimney wall 17 and the outer containment 2, i.e. by defining the air cooling channel 17 by the chimney wall 17 and the outer containment 2, thereby improving the impact resistance. Therefore, the air cooling channel 171 of the PCS2 is non-annular, and is a plurality of independent stripe in the circumferential direction, as shown in FIG. 2. The relative positions of the air cooling channel 171, the concrete outer containment 2, the air outlet 5 and the water tank 6 are shown in FIG. 2. The number of the air cooling channel 171 depends on a power requirement and a site condition to reduce the weight of the chimney wall 17.

In the embodiment shown in FIG. 1, the air outlet 21 of the air cooling channel 171 of PCS2 is disposed above the air cooling channel 171 and the air inlet 18 of the air cooling channel is disposed below the air cooling channel 171.

In the embodiment shown in FIG. 4, the air outlet of PCS2 is disposed above the concrete outer containment 2 and shares the same air outlet with PCS1, thereby reducing dramatically the height of the chimney wall 17 and the whole weight of the chimney wall 17 and meeting the height demand of the natural circulation of the air. Preferably, when the chimney wall 17 and the outer containment 2 are formed integrally, PCS2 is preferably arranged in a high position even near the top of the outer containment 2.

In the embodiment shown in FIG. 3, PCS1 and PCS2 have an independent air inlet and an independent air outlet respectively. The arrangement reduces an influence of the air outlet of PCS2 on the air inlet of PCS2, so that PCS1 and PCA2 are independent each other, thereby easily meeting the corresponding demands of aseismic ability and arrangement. In the embodiment, preferably, PCS2 is preferably arranged at a low position, i.e. near the lower part of the outer containment 1.

In the embodiment shown in FIG. 1, PCS1 and PCS2 share the same air inlet. A part of the air flows into the air duct 200 of PCS1 via air inlet 4 to cool the steel inner containment 1 and the heated air is released to the atmosphere via the air outlet 5. The other part of the air passes through the filter 19 to cool the external air cooler 12, flows upward after being heated and is released to the atmosphere via the air outlet 21 of the air cooling channel. Compared with the embodiment shown in FIG. 3, no air deflector 3 may be disposed since the air inlet is disposed at the lower part. In order to ensure a better air mobility in a transition region of the straight segment and the upper head the inner containment 1, a partial air deflector 3 can be disposed in the place, as shown in FIG. 1. In the embodiment in FIG. 3, PCS2 is preferably disposed in a lower portion.

As described above, in order to collect the condensed water of the built-in heat exchanger 9 and the outer surface of the correspond ducts, the condensate water collector 38 is disposed below the built-in heat exchanger 9. The condensed water collected enters into the built-in refueling water tank in the inner containment 1 via the drainpipe 39 and participates in the next circulation.

To avoid deposition of dust on the outer heat exchange pipe 120 during a spare period and a normal nm of PCS2, the filter 19 is disposed below the external air cooler 12 and above the air inlet 18 of the air cooling channel. To avoid air leakage, the external air cooler 12 and the supporting component 20 should be sealed to make sure that the upward air passes through the tube bundle region of the external heat exchanger 9. To ensure sealing when the first communication pipe 13 and the communication pipe 14 pass through the inner containment 1 and the outer containment 2, penetrating pieces 37 are respectively disposed inside the wall of the inner containment 1 and the outer containment 2.

The expansion tank 22 can provide PCS2 with original water and can provide a buffer for the volume expansion of PCS2 during run. An amount of the heat-carrying agent in the expansion tank 22 is sufficient for a load of the heat-carrying agent of PCS2 and a load of the heat-carrying agent of PCS2 after the pipes between the second pneumatic valve 15 and the first pneumatic valve 11 via the external air cooler 12 are drained. To avoid that non-condensate gas is accumulated in PCS2, PCS2 is provided with an air vent. The air of PCS2 is communicated with the expansion tank 22 via the venting pipe 24 and enters into the inner containment via the second venting valve 26; so that the air of PCS2 is released without lost of the heat-carrying agent due to leaking.

During the spare period of PCS2, a water medium and a wording medium of PCS2 are maintained by the auxiliary circulation system for heat-carrying agent. The auxiliary circulation system for heat-carrying agent mainly comprises the second heat-carrying agent pipe 30, the circulation pump 31, the preheater 32, the feed tank 33 and the first heat-carrying agent pipe 35. The second heat-carrying agent pipe 30 is connected with the second valve 29 of the upper header (the upper header shown in FIG. 1) of the external air cooler 12. The first heat-carrying agent pipe 35 is connected with the first valve 36 of the lower header (the lower header shown in FIG. 1) of the external air cooler 12. The heat-carrying agent tank 34 is connected with the inlet of the circulation pump 31 to supplement water to PCS2. The working medium and the water supplemented flow in PCS2 by the circulation pump 31 and the water medium in PCS2 is maintained by means of adding an additive. The auxiliary circulation system for heat-carrying agent is placed in the auxiliary building.

To improve the applicability, for example to protect PCS2 under the condition of detection, maintenance and a cold weather, a drainage process can be conducted for PCS2. Two drainage valves are disposed in PCS2. The first drainage valve 27 is disposed at the bottom of the lower header of the external air cooler 12. Drainage process is conducted via the first drainage pipe 28, and the drainage enters into a region between the concrete outer containment 2 and the inner containment 1 and is drained via a spraying drainage loop of PCS1. To ensure the drainage effect, the upper header and lower header of the external air cooler 12 and the first horizontal pipe segment 131 and the second horizontal pipe segment 141 are aslant arranged so that the water of the first horizontal pipe segment 131 and the second horizontal pipe segment 141 behind the first pneumatic valve 11 can flow back to the external air cooler 12, thereby avoiding the damage to the ducts due to freezing. The second drainage valve 16 is disposed at the third horizontal pipe segment 143. The third horizontal pipe segment 143 and the inlet header 91 and the outlet header 92 of the built-in heat exchanger 9 are aslant arranged so that the accumulated water in the ducts of the inner containment 1 can be totally drained out via the second drainage valve 16.

The passive containment heat removal system according to the present invention can be used in to a cold weather, which shows a great applicability for the plant location, and can be applied to any AP/CAP series of nuclear power plants.

Firstly, for the plant location where there is no frozen period in the whole year, during the normal run of the nuclear power plant, the first pneumatic valve 11 and the second pneumatic valve 15 of PCS2 are always open. The loop of PCS2 is fulfilled with water. When a rupture accident happens, the heat can be removed automatically by PCS2 without additional outside power supply. During the normal run of the nuclear power plant, the water medium are detected and regulated by the auxiliary circulation system for heat-carrying agent.

Secondly, for the plant location where there is a short frozen period, operation instructions are made according to the local climate for daily maintenance. The PCS2 is originally in full-water state. When the frozen period comes, the first pneumatic valve 11 and the second pneumatic valve 15 are closed. The water in devices and ducts exposed to the cold environment is drained via the first drainage valve 27 to avoid freezing.

Thirdly, for the plant location where there is a long frozen period, no water exists in the loop of PCS2 during the normal run of the nuclear power plant. When an accident happens, the first venting valve 25 and the second venting valve 26 are trigged by the safety signal to open. Water is injected to the loop of PCS2 by the expansion tank 22 and the non-condensed air is induced to the inner containment 1 via the upper part of the venting pipe 24, the first venting valve 25 and the second venting valve 26. When the water injection is completed, the first venting valve 25 is timely and automatically closed to avoid air leakage.

In the passive containment heat removal system according to the embodiments of the present invention, when an accident happens, PCS1 and PCS2 are nm together to remove the heat from the inner containment 1. At this point PCS1 is run in the air cooling mode and the water spraying mode. When the water in the water tank 6 is exhausted, the decay heat is removed by PCS2 and the air cooing of PCS1.

In the passive containment heat removal system according to the embodiments of the present invention, PCS1 and PCS2 are independent physically, but they work in coordination with each other when performing the safety function. The volume will be too large to apply to an engineering application without PCS1. A loading requirement for PCS2 is reduced dramatically by providing PCS1. The working time of the water tank 6 can be prolonged by providing PCS2. In particular, the problem of active water supply of the water tank 6 after 72 hours can be completely solved and the ability of the nuclear power plant to deal with accidents is improved. The safety performance of the whole nuclear unit is also further improved.

The passive containment heat removal system according to the embodiments of the present invention shows the following technical advantages compared with the conventional passive containment heat removal system:

Working time of the water tank 6 is prolonged by providing PCS2, which is beneficial to the safety performance, compared with the passive containment heat removal system of the conventional AP/CAP series of nuclear power plants;

Water consumption and the amount of water spraying per unit time are reduced by providing PCS2. Therefore, the size and diameter of the spraying pipe 8 and the spraying valve 7 are reduced, which is beneficial to reducing the weight thereby optimizing the plant arrangement;

By providing PCS2, no active water supplement is required after the water in water tank 6 is exhausted. A passive containment heat removal with no time limit can be basically achieved;

Compared with the passive containment heat removal system in prior art, there are less heat transfer process of PCS2, which reduces the thermal resistance during heat transfer and increases the efficiency of heat transfer, Compared with open-type passive containment heat removal system, when the heat conduct pipe of the built-in heat exchanger of PCS2 is broken, the radioactive substance would not be discharged to the environment since the external air cooler 12 works as another physical protection;

The built-in heat exchanger of PCS2 is disposed in an open space of the inner containment, which is beneficial to service and maintenance;

PCS2 and the main steam supply system of the pressurized water reactor are not directly connected, which would not cause an additional heat lose and reduce the thermal efficiency of the unit;

The auxiliary loop of the passive containment heat removal system according to an embodiment of the present invention can effectively maintain the working medium in PCS2;

PCS2 can be run under different run modes depending on the weather, which shows the applicability for the plant location;

PCS2 is smoothly run in single phase without the evident flow instability;

The condensed water can be drained to a specified position by the condensed water collector for the duplicate usage.

The control and regulation of the passive containment heat removal system according to an embodiment of the present invention described above using different heat-carrying agents are described as follows.

When water is used as the heat-carrying agent:

1) For the plant location where there is no frozen period, e.g. the region with a high temperature in the whole year, the first pneumatic valve 11 and the second pneumatic valve 15 are always open. When an accident happens, the decay heat of the reactor core transfers to the inner containment 1 and the air cooling of PCS1 is firstly started by the air duct 200. The pressure in the inner containment 1 is increased since its heat carrier ability is lower than the decay heat of the reactor core. The electric valve 71 and the pneumatic valve 72 in the spraying assembly 10 are opened by high pressure to spray cooling water to the inner containment 1, so that the heat is removed from the inner containment land the PCS1 is completely operated. The built-in heat exchanger 9 is heated by the air in the inner containment 1 since the first pneumatic valve 11 and the second pneumatic valve 15 are open. The air is naturally circulated by the density difference and the height difference and the heat is removed from the inner containment 1 to the atmosphere via the external air cooler 12. PCS2 and the air cooler of PCS1 are firstly run, and the spraying cooler of PCS1 is slightly delayed to run.

If water drainage is required when the external air cooler 12 is overhauled, the first electric drainage valve 271 and the first pneumatic drainage valve 272 are opened for the drainage; If water drainage is required when the built-in heat exchanger 9 is overhauled, the second electric drainage valve 161 and the second pneumatic drainage valve 162 are opened for the drainage. The expansion tank 22 is mainly used to absorb the expansion of the water medium and supplement water to the ducts after water drainage. But the volume of the expansion tank 22 is limited so that water supplement is relied on the subsystem 300.

2) for the plant location where there is a frozen period, e.g. the region with a low temperature for the whole year or only for winter, when an accident happens, the pressure in the inner containment 1 is increased, which triggers to open the electric valve 71 and the pneumatic valve 72 of the spraying assembly 10 to spray the cooling water to the inner containment 1 and remove the heat thereof. Meanwhile, the first venting valve 25 and the second venting valve 26 are opened to supplement water and release the air of the loop. The built-in heat exchanger 9 is heated by the air in the inner containment. The air is naturally circulated by the density difference and the height difference and the heat is removed from the inner containment 1 to the atmosphere via the external air cooler 12. Since the water supplement is required, the air cooler of PCS1 are firstly run, and the spraying cooler of PCS1 is subsequently rim, and PCS2 is finally run.

It will be appreciated that in the region or the season with a low temperature, to avoid freezing in the external air cooler, the first communication pipe and the second communication pipe can be drained during the normal run, and when an accident happens, the water is supplemented to the loop automatically. Alternatively, the water can exist in the external air cooler and the first and the second communication pipe. Meanwhile, a temperature detector can be disposed to detect the environment temperature, e.g. the temperature of the air cooling channel 171. When the temperature is lower than 0° C. and no accident happens, the water in the external air cooler and the first and the second communication pipe is drained.

For the water medium, the expansion tank 22 of PCS2 may not be used to supplement the water, but a pressure-containing water tank of the auxiliary circulation system for heat-carrying agent can be used to supplement the water when an accident happens. When an accident happens, the water supply valve of the pressure-containing water tank is opened by the high pressure of the inner containment and the water is supplied to the loop. After a period of time-delay, the water supply valve of the pressure-containing water tank is closed.

When an organic heat-carrying agent is used, to avoid freezing, an organic heat-carrying agent is preferably used. (It will be appreciated herein that the organic heat-carrying agent is referred to the heat-carrying agent which can be applied to the a cold season or region and cannot freeze in the cold season or region and which can be Freon, glycol or the mixture of glycol and water as long as the heat-carrying agent cannot freeze under a cold weather.) The first pneumatic valve 11 and the second pneumatic valve 15 can be omitted in the main loop of PCS2, and the first drainage valve 27 of the external air cooler can be omitted. When an accident happens, PCS2 is automatically run, while PCS1 is started by triggering the electric valve 71 and the pneumatic valve 72 of the spraying assembly 10 to open by the increased pressure of the inner containment 1, in order to spray the cooling water to the inner containment 1 and remove the heat thereof. PCS2 and the air cooling of PCS1 are firstly run, and the spraying cooler of PCS1 is slightly delayed to run.

For the loop with an organic heat-carrying agent as the working medium, the vacuum pump and a heat-carrying agent supplement system can be disposed to regularly release the air leaking into the system and supplement the heat-carrying agent. If an overhaul is required, the heat-carrying agent is drained via the drainage pipe under the built-in heat exchanger.

Reference throughout this specification to "an embodiment," "some embodiments," "one embodiment", "a specific example," or "some examples," means that a particular feature, structure, material, or characteristic described in connection with the embodiment or example is included in at least one embodiment or example of the present disclosure. Thus, in the present specification, the term of the above schematic representation is not necessary referring to the same embodiment or example. Furthermore, the particular features, structures, materials, or characteristics described may be in any one or more of the example embodiments in combination or in a suitable manner. Furthermore, when different embodiments or examples, and various exemplary embodiments or features in the embodiments are not mutually contradictory, those skilled in the art can be described in this specification and the binding composition.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A passive containment heat removal system, comprising:
   an outer containment (2);
   an inner containment (1) disposed in the outer containment (2),
   an air duct (200) formed between the inner containment (1) and the outer containment (2) having an air inlet (4) and an air outlet (5);

a spraying assembly (10) disposed outside the inner containment (1) and configured to passively spray cooling water to an outer wall of the inner containment (1) to cool the inner containment (1);

a built-in heat exchanger (9) disposed in the inner containment (1);

an air cooling channel (171) located outside the outer containment (2) and having an air inlet (18) of the air cooling channel and an air outlet (21) of the air cooling channel, wherein the air cooling channel (171) is defined by a chimney wall (17) and an outer wall of the outer containment (2) or by the chimney wall (17) isolated from the outer containment (2); and an external air cooler (12) disposed in the air cooling channel (171) with an inlet connected with an outlet of the built-in heat exchanger (9) via a first communication pipe (13) and an outlet connected with an inlet of the built-in heat exchanger (9) via a second communication pipe (14), wherein a filter (19) is disposed in the air cooling channel (171) between the air inlet of the air cooling channel (18) and the external air cooler (12);

wherein a plurality of the air cooling channels (171) are provided and arranged at regular intervals in a circumferential direction of the outer containment (2), a plurality of the external air coolers (12) are provided and disposed correspondingly in the plurality of the air cooling channels (171), and a plurality of the built-in heat exchangers (9) are provided, each of the built-in heat exchangers (9) being connected with at least one of the external air coolers (12).

2. The passive containment heat removal system according to claim 1, wherein when an accident happens, the spraying assembly sprays the cooling water to the outer wall of the inner containment and a heat-carrying agent is circulated naturally between the external air cooler and the built-in heat exchanger to cool the inner containment, so that an amount of spraying water of the spraying assembly is reduced per unit time and a spraying time is extended; and after the cooling water of the spraying assembly is exhausted, the inner containment is cooled by an air in the air duct and the heat-carrying agent circulated naturally between the external air cooler and the built-in heat exchanger.

3. The passive containment heat removal system according to claim 1, wherein when an accident happens, the spraying assembly sprays the cooling water to the outer wall of the inner containment to cool the inner containment and at the same time a heat-carrying agent is not circulated naturally between the external air cooler and the built-in heat exchanger; and after the cooling water of the spraying assembly is exhausted, the inner containment is cooled by the air flow in the air duct and the heat-carrying agent circulated naturally between the external air cooler and the built-in heat exchanger.

4. The passive containment heat removal system according to claim 1, wherein when an accident happens, the spraying assembly sprays the cooling water to the outer wall of the inner containment to cool the inner containment;

when a temperature and/or a pressure in the inner containment exceeds a designated threshold value during spraying the cooling water, a heat-carrying agent is circulated naturally between the external air cooler and the built-in heat exchanger; and after the cooling water of the spraying assembly is exhausted, the inner containment is cooled by the air flow in the air duct and the heat-carrying agent circulated naturally between the external air cooler and the built-in heat exchanger.

5. The passive containment heat removal system according to claim 1, wherein when an accident happens, the spraying assembly sprays the cooling water to the outer wall of the inner containment to cool the inner containment, and after the cooling water of the spraying assembly is exhausted, the inner containment is cooled by the air flow in the air duct, and when the temperature and/or the pressure in the inner containment exceeds the designated threshold value during spraying the cooling water as well as after the cooling water is exhausted, the heat-carrying agent is circulated naturally between the external air cooler and the built-in heat exchanger.

6. The passive containment heat removal system according to claim 1, wherein a lower part of the air cooling channel (171) is open to form an air inlet of an air cooling channel (18), an air outlet of an air cooling channel (21) is formed on the outer wall of the outer containment (2), and the air cooling channel (171) is communicated with the air duct (200) via the air inlet (4) located below the lower part of the air cooling channel (171).

7. The passive containment heat removal system according to claim 1, wherein the air inlet (4) is located above an upper part of the air cooling channel (171), and the air inlet of the air cooling channel (18) and the air outlet of the air cooling channel (21) are formed on the chimney wall (17).

8. The passive containment heat removal system according to claim 1, wherein the air inlet (4) is adjacent to a lower part of the outer containment (2) to communicate the air cooling channel (171) with the air duct (200), and the air inlet of the air cooling channel (18) and the air outlet of the air cooling channel (21) are formed on the chimney wall (17).

9. The passive containment heat removal system according to claim 1, further comprising an expansion tank (22) with a first opening (221) and a second opening (222), wherein the expansion tank (22) is disposed in the inner containment (1), the first opening (221) is connected with the first communication pipe (13) via a venting pipe (24) and the second opening (222) is connected with the second communication pipe (14) via a connecting pipe (23).

10. The passive containment heat removal system according to claim 7, wherein a bottom surface of the expansion tank (22) is above the built-in heat exchanger (9) and the external air cooler (12).

11. The passive containment heat removal system according to claim 9, wherein the first communication pipe (13) comprises a first horizontal pipe segment (131) and a first vertical pipe section (132), and the external air cooler and the first horizontal pipe segment are aslant arranged with respect to a horizontal direction;

the second communication pipe (14) comprises a second horizontal pipe section (141), a second vertical pipe section (142) and a third horizontal pipe section (143), and the built-in heat exchanger, the second horizontal pipe section (141) and the third horizontal pipe section (143) are aslant arranged with respect to a horizontal direction.

12. The passive containment heat removal system according to claim 1, further comprising:

a condensate water collector (38) for collecting condensate water disposed in the inner containment (1) and located below the built-in heat exchanger (9), and a drainage pipe (39) connected with a drainage outlet of the condensate water collector (38).

13. The passive containment heat removal system according to claim 1, wherein a level of a top of the external air cooler (12) is above a level of a top of the built-in heat exchanger (9), and a level of a bottom of the external air cooler (12) is above a level of a bottom of the built-in heat exchanger (9).

14. The passive containment heat removal system according to claim 1, wherein the spray assembly (10) comprises:
a water tank (6) disposed outside of the outer containment (2);
a spray pipe (8) with a first end connected with the water tank (6) and a second end located on a top of the inner containment (1); and
a spray valve (7) disposed at the spray pipe (8).

15. A method for controlling the passive containment heat removal system according to claim 1, comprising:
the passive containment heat removal system as defined in claim 1; and
triggering automatically spraying of the cooling water to the outer wall of the inner containment to cool the inner containment by spraying and circulating naturally the heat-carrying agent between the inner containment and the outer containment to cool the inner containment when an accident happens.

16. The method for controlling the passive containment heat removal system according to claim 15, comprising:
spraying the cooling water to the outer wall of the inner containment while circulating the heat-carrying agent naturally between the inner containment and the outer containment in order to reduce the amount of spraying water per unit time and extend the spraying time, and
cooling the inner containment by the air flow in the air duct between the inner containment and the outer containment and by the heat-carrying agent circulated naturally between the inner containment and the outer containment after the cooling water is exhausted.

17. The method for controlling the passive containment heat removal system according to claim 15, comprising:
circulating naturally the heat-carrying agent between the external air cooler and the built-in heat-exchanger during spraying the cooling water, and
cooling the inner containment by the air flow in the air duct between the inner containment and the outer containment and by the heat-carrying agent circulated naturally between the inner containment and the outer containment after the cooling water is exhausted.

18. The method for controlling the passive containment heat removal system according to claim 15, comprising:
circulating naturally the heat-carrying agent between the inner containment and the outer containment when the temperature and/or the pressure of the inner containment exceeds the designated threshold value during spraying the cooling water, and
cooling the inner containment by the air flow in the air duct between the inner containment and the outer containment and by the heat-carrying agent circulated naturally between the inner containment and the outer containment after the cooling water is exhausted.

19. The method for controlling the passive containment heat removal system according to claim 15, comprising:
cooling the inner containment by the air flow in the air duct between the inner containment and the outer containment after the cooling water is exhausted, and
circulating the heat-carrying agent naturally between the inner containment and the outer containment when the temperature and/or the pressure of the inner containment exceeds the designated threshold value during spraying the cooling water as well as after the cooling water is exhausted.

20. The passive containment heat removal system according to claim 1, further comprising a first drainage pipe (28) and a first drainage valve (27) disposed in the first drainage pipe (28), and a second drainage pipe (163) and a second drainage valve (16) disposed in the second drainage pipe (28), wherein
a first end of the first drainage pipe (28) is connected with the external air cooler (12), a second end of the first drainage pipe (28) is connected with the air duct (200), and the first drainage valve (27) comprises a first electric drainage valve and a first pneumatic drainage valve which are connected with each other in series;
the second drainage pipe (163) is disposed in the inner containment (1) and connected with the second communication pipe (14), and the second drainage valve (16) comprises a second electric drainage valve and a second pneumatic valve which are connected with each other in series.

21. The passive containment heat removal system according to claim 1, wherein a first penetrating piece is disposed in a wall of the inner containment and a second penetrating piece is disposed in a wall of the outer containment, the first communication pipe and the second communication pipe pass through the first penetrating piece and the second penetrating piece and extend from the inner containment to an outside of the outer containment.

* * * * *